(12) United States Patent
Nelmes et al.

(10) Patent No.: US 7,933,791 B2
(45) Date of Patent: Apr. 26, 2011

(54) ENTERPRISE PERFORMANCE MANAGEMENT SOFTWARE SYSTEM HAVING VARIABLE-BASED MODELING

(75) Inventors: Andrew Thomas Nelmes, London (GB); George Duncan Pearson, York (GB); Johnathan Hodge, Croydon (GB); John Martin Pitstick, Burnsville, MN (US); Michael Gould, Yearsley (GB)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 11/894,376

(22) Filed: Aug. 21, 2007

(65) Prior Publication Data
US 2008/0065470 A1 Mar. 13, 2008

Related U.S. Application Data

(60) Provisional application No. 60/842,738, filed on Sep. 7, 2006.

(51) Int. Cl.
G06F 9/44 (2006.01)
(52) U.S. Cl. .......................................... 705/7
(58) Field of Classification Search ........................ None
See application file for complete search history.

(56) References Cited

U.S. PATENT DOCUMENTS

| | | | | |
|---|---|---|---|---|
| 5,101,352 A * | 3/1992 | Rembert | ........................... | 705/8 |
| 5,615,109 A * | 3/1997 | Eder | ................................ | 705/8 |
| 6,609,123 B1 * | 8/2003 | Cazemier et al. | ................. | 707/4 |
| 6,750,864 B1 * | 6/2004 | Anwar | ........................... | 345/440 |
| 6,768,995 B2 * | 7/2004 | Thier et al. | .................... | 707/100 |
| 6,995,768 B2 * | 2/2006 | Jou et al. | ....................... | 345/440 |
| 7,062,479 B2 * | 6/2006 | Edmunds et al. | ..................... | 1/1 |
| 7,072,822 B2 * | 7/2006 | Humenansky et al. | ......... | 703/22 |
| 7,111,007 B2 * | 9/2006 | Thier et al. | .................... | 707/100 |
| 7,130,822 B1 * | 10/2006 | Their et al. | ....................... | 705/35 |
| 7,213,199 B2 * | 5/2007 | Humenansky | ............... | 715/209 |
| 7,293,008 B2 * | 11/2007 | Potter et al. | .......................... | 1/1 |
| 7,363,287 B2 * | 4/2008 | Kilmer et al. | .................... | 707/2 |
| 7,530,012 B2 * | 5/2009 | Medicke et al. | .............. | 715/212 |
| 7,702,638 B2 * | 4/2010 | Tsyganskiy et al. | ....... | 707/999.1 |
| 7,720,879 B2 * | 5/2010 | Tsyganskiy et al. | .......... | 707/803 |
| 2002/0049701 A1 * | 4/2002 | Nabe et al. | ........................ | 707/1 |
| 2004/0064348 A1 * | 4/2004 | Humenansky et al. | ........... | 705/7 |
| 2004/0138942 A1 * | 7/2004 | Pearson et al. | .................. | 705/10 |
| 2004/0237029 A1 * | 11/2004 | Medicke et al. | .............. | 715/503 |

(Continued)

OTHER PUBLICATIONS

"Cognos Web Reporting User Training" (University of Alberta).*

(Continued)

*Primary Examiner* — Romain Jeanty
*Assistant Examiner* — Brett Feeney
(74) *Attorney, Agent, or Firm* — Shumaker & Sieffert, P.A.

(57) ABSTRACT

An enterprise planning and performance management system provides a variable-based modeling technique that enables users to interact with a more manageable variable-centric front-end for complex enterprise planning software. The system enables users to specify a plurality of variable definitions via a variable-based user interface. Based on the plurality of variable definitions, the system generates, and in some instances automatically generates, model data that defines an enterprise planning model. The system uses the model data during subsequent enterprise planning sessions. Because model builders typically comprise financial analysts unfamiliar with traditional complex enterprise modeling techniques but familiar with common financial variables of an enterprise, this variable-based modeling technique may facilitate easier model building by allowing these financial analysts to generate model data from the perspective of the more readily understood variables.

19 Claims, 10 Drawing Sheets

U.S. PATENT DOCUMENTS

| | | | | |
|---|---|---|---|---|
| 2006/0200448 A1* | 9/2006 | Edmunds et al. | ............... | 707/2 |
| 2006/0241999 A1* | 10/2006 | Tsyganskiy et al. | ............... | 705/9 |
| 2006/0242207 A1* | 10/2006 | Tsyganskiy et al. | ............ | 707/203 |
| 2006/0293940 A1* | 12/2006 | Tsyganskiy et al. | ............... | 705/8 |
| 2007/0067773 A1* | 3/2007 | Hope et al. | .................. | 718/100 |
| 2007/0073737 A1* | 3/2007 | Patterson | .................... | 707/100 |

OTHER PUBLICATIONS

Cognos Training—PowerPlay OLAP Modeling for Series 7 version 3 and Cognos 8 BI (Cognos).*

Cognos Enterprise Planning Series—Analyst (Cognos Jan. 2004).*

"Cognos ReportNet User Guide," version 1.1 (Cognos 2004).*

"Oracle FastFormula User's Guide," release 11.0 (Oracle 1995).*

"PowerPlay Web User's Guide," Version 7.3 (Cognos 2004).*

Brian L. Webster, "Cognos PowerPlay Training, Customer Calculations Example," (City of Fresno May 9, 2006).*

International Preliminary Report on Patentability from corresponding PCT Application Serial No. PCT/US2007/019452 mailed Mar. 19, 2009 (17 pages).

International Search Report and Written Opinion for corresponding PCT Application Serial No. PCT/US07/19452, mailed Sep. 5, 2008 (12 pages).

* cited by examiner

ENTERPRISE PERFORMANCE MANAGEMENT SOFTWARE SYSTEM HAVING VARIABLE-BASED MODELING

This application claims the benefit of U.S. Provisional Application Ser. No. 60/842,738, filed Sep. 7, 2006, the entire content of which is incorporated herein by reference.

TECHNICAL FIELD

The invention relates to enterprise computing environments, and more particularly, to enterprise performance management systems.

BACKGROUND

Enterprise software systems are typically sophisticated, large-scale systems that support many, e.g., hundreds or thousands, of concurrent users. Examples of enterprise software systems include financial planning systems, order management systems, inventory management systems, sales force management systems, business intelligence tools, enterprise reporting tools, project and resource management systems, and other enterprise software systems.

Many enterprise performance management and business planning applications require a large population of users to enter data that the software then accumulates into higher level areas of responsibility in the organization. The system may store the data into complex multi-dimensional data structures referred to as "data cubes." The system may perform mathematical calculations on the data, combining data submitted by one user with data submitted by another. Using the results of these calculations, the system may generate reports.

Underneath this planning process, the software system maintains a model that represents the enterprise. The model may include a number of hierarchically arranged nodes representing various organizational units within the enterprise, such as business units or departments. Prior to the planning and performance management process, typically, analysts, such as the chief financial officer, senior financial analysts, or product and sales analysts, construct the model so as to reflect the organization of the enterprise prior to data entry by the various users. The analysts build the model by importing information from a variety of different enterprise systems and relating imported data items. Frequently, the analysts must construct and manipulate the model in seemingly unintuitive ways so as to achieve the desired result. As one example, this effort may require the analysts to specify the various dimensions of the multi-dimensional data, which in turn, requires them to understand complicated interactions between the nodes of the model. As another example, in order to control access during the planning process, the analysts are often required to define an access list for each node of the model, thereby requiring them to understand possibly thousands of nodes arranged within the model. In large enterprises, this model building phase becomes cumbersome as the analysts may be required to perform these unintuitive procedures, such as defining access lists, for hundreds, if not thousands of users.

SUMMARY

The invention is directed to enterprise planning and performance management techniques that improve the ease of use of complex software within large organizations. For example, variable-based modeling techniques are described that enable a model builder, such as an analyst, to interact with a manageable, variable-centric front-end user interface for complex enterprise modeling and performance management software. The techniques facilitate modeling of an enterprise through the use of a "variable-based" user interface that allows the modeler to provide a plurality of variable definitions that operate as the corner stones for model development. That is, embodiments of the described techniques allow the model builder to construct a complex model for an enterprise planning and performance management system from the perspective of the variables (e.g., financial variables) that ultimately will be used to analyze data collected during the planning process. Because the analysts are more likely understand financial variables rather than complex organizations of multidimensional data and interactions between such data, the techniques facilitate modeling by those analysts more comfortable with variables, without sacrificing functionality for those who understand the more complex modeling process.

According to the techniques, an enterprise planning and performance management system enables corporate analysts to specify a plurality of variable definitions via a variable-based user interface presented by the system. Once all such variable definitions are defined, the enterprise planning and performance management system generates model data that defines an enterprise planning model for use during subsequent enterprise planning sessions based on the plurality of variable definitions. The model data refers to an intermediate representation of the model definition that is generated from the variable definitions and other declarations made by the model builder for subsequent interpretation and implementation by the enterprise planning and performance management system.

For example, an analyst may log into the system and begin an enterprise planning session, whereby the analyst interacts with the variable-based user interface to define a number of aspects or features of the variable definitions. The analyst may specify a variable named "Revenue," for example, and a formula for the "Revenue" variable definition. Moreover, the analyst may specify dimensions and dimension types, and dimension controls for the "Revenue" variable definition. Once finished defining all such variables, the system generates model data from these variable definitions, and in the example of the "Revenue" variable dimension, generates model data specifying the entered dimensionality, dimension type, and dimension control in the generated model data. During subsequent enterprise planning sessions involving contributors and reviewers, these users may enter data relevant to such variables, whereupon the model data defines how such data is stored within the system. In this manner, the system may simplify the modeling process for analysts unfamiliar with conventional complex modeling techniques.

In one embodiment, a computer-implemented method of performing an enterprise planning session comprises presenting, with an enterprise planning system, a user interface for defining a plurality of variable definitions to specify a plurality of variables to be used during an enterprise planning session, and generating model data that defines an enterprise planning model for use within a subsequent enterprise planning session based on the plurality of variable definitions received via the user interface. The method further comprises executing software to conduct the enterprise planning session by capturing planning data from a set of contributors, aggregating the contribution in accordance with the model to form aggregated planning data for the enterprise planning session, and presenting a forecast to a user based on the aggregated planning data.

In another embodiment, a computing system comprises a computer-readable storage medium storing enterprise planning software. The enterprise planning software includes an analysis software module for execution by the computing system to present a user interface. The user interface includes a plurality of input areas to receive a plurality of variable definitions that specify a plurality of variables to be used by the enterprise planning system during an enterprise planning session. The analysis software generates model data that defines an enterprise planning model for use within the enterprise planning session based on the plurality of variable definitions received from a user via the user interface.

In another embodiment, a computer-readable storage medium (e.g., memory or disk) comprises executable software instructions. The instructions cause a programmable processor to present, with an enterprise planning system, a user interface with which a user interacts to provide a plurality of variable definitions to specify a plurality of variables to be used during an enterprise planning session. The user interface includes an input area to receive a default formula for each of the variable definitions. The user interface includes a second input area to receive an optional override formula for each of the variable definitions. The instructions further cause the processor to generate model data that defines an enterprise planning model for use within the enterprise planning session based on the plurality of variable definitions received via the user interface, and execute software to conduct the enterprise planning session by capturing planning data from a set of contributors and aggregating the contribution in accordance with the model to form aggregated planning data for the enterprise planning session. The instructions further cause the processor to apply the first formula of each variable to the planning data to compute a value for the variable for future periods within a forecast, and when specified, apply the optional override formula of each variable to the planning data to compute a value for the variable for historical periods within a forecast. The instructions further cause the processor to output the forecast to a user, e.g., by electronic display, print or other means.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
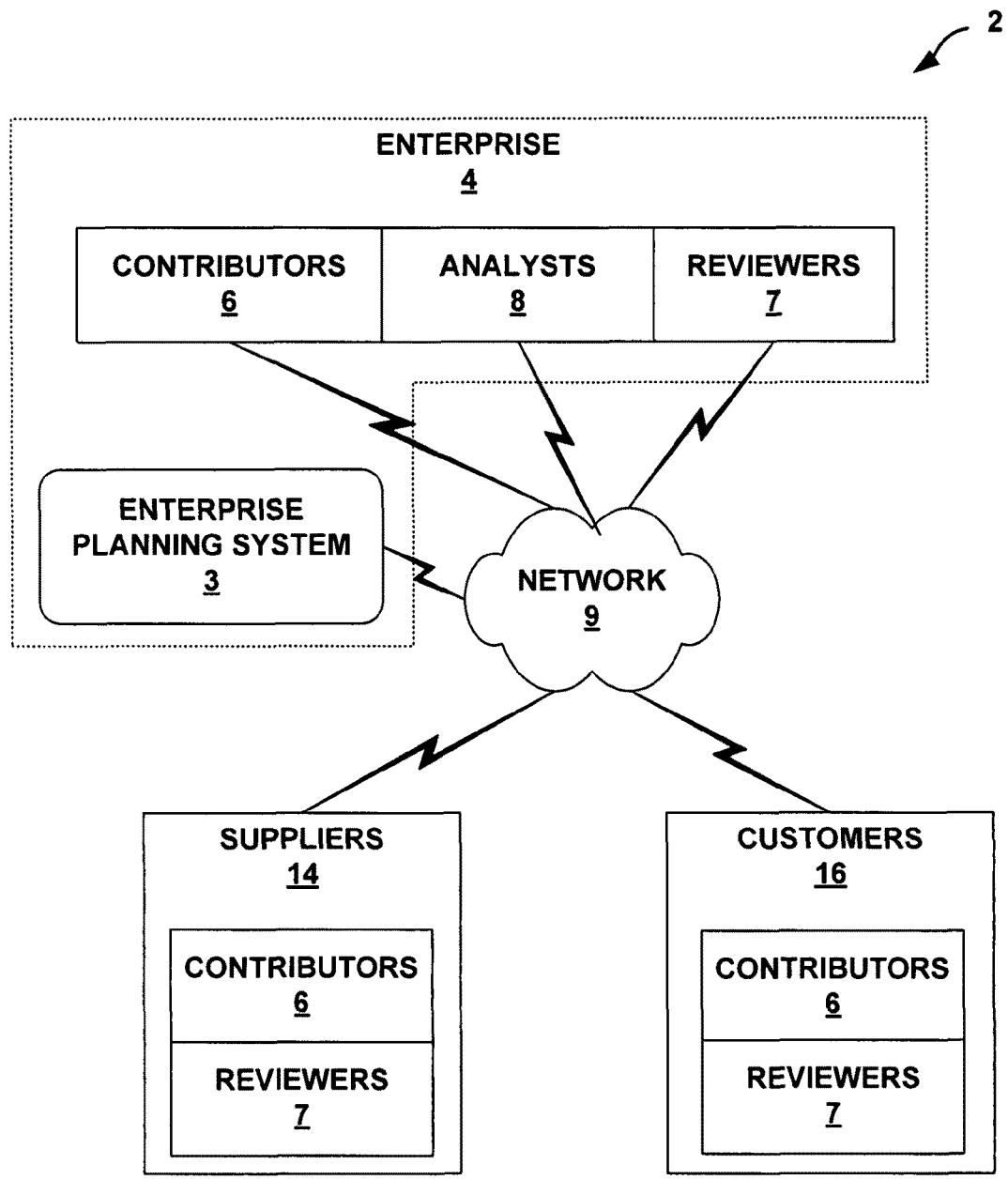
FIG. 1 is a block diagram illustrating an environment in which an enterprise planning and performance management system incorporates variable-based modeling techniques.

FIG. 1 is a block diagram illustrating an environment 2 in which an enterprise planning and performance management system 3 incorporates variable-based modeling techniques. Generally, enterprise planning and performance management system 3 provides three stages of enterprise planning: (1) a modeling stage during which a model is constructed, (2) a contribution stage during which planning data is collected, and (3) a review and performance management stage during which the planning data can be selectively accepted and analyzed. In the modeling stage, a team of analysts 8, such as the chief financial officer, senior financial analysts or product and sales analysts, define requirements and build planning models for enterprise 4. In this example, via the enterprise planning session, analysts 8 develop an enterprise planning model having a number of hierarchically arranged nodes representing various cost centers within enterprise 4, such as business units or departments, in a more intuitive variable-based manner.

During this modeling stage, analysts 8 define the enterprise planning model through interactions with an intuitive "variable-based" user interface (not shown in FIG. 1). This variable-based user interface enables analysts 8 to define a plurality of variables, such as financial variables, that will be utilized during the reconciliation and review process for performance management purposes. The variable-based user interface allows analysts 8 to first define the relevant output variables, and then construct the model relative to these variables. Enterprise planning and performance management system 3 then generates, and in some implementations may be configured to automatically generate, model data. The model data defines an enterprise planning model for use within a subsequent enterprise planning session based on the plurality of variable definitions received via the user interface.

In constructing the variable definitions, analysts 8 interact with the user interface to define one or more variables by providing a variable definition for each variable that may be important during the review and performance management stage. In one embodiment, a variable definition may include a variable name, a "main formula" also referred to as a "default formula" to compute a value for the variable, a dimensionality, a dimensionality type associated with the dimension, a dimensional control, a time aggregate formula that overrides the formula in certain instances, a hierarchy aggregate formula that also overrides the formula in certain other instances, an actual formula to override the formula for historical periods, and a variable "member of" specification. For each aspect of the variable definition, the user interface may include a separate input area to specify the variable name, formula, dimensionality and the other information. In the below described exemplary user interface, the input areas constitute columns in a spreadsheet or table-based user interface, where each row accepts a single variable definition. While described herein in this context, the user interface may include other forms of input areas, such as text input boxes, check boxes, radio buttons, and drop-down boxes. The invention, therefore, should not be limited strictly to a spreadsheet user interface, but may include any user interface capable of accepting as inputs the above aspects of the variable definition via any conventional input area.

Although described below in more detail, a brief description of the various exemplary aspects of a variable definition follows. The variable name specifies a unique name for each variable definition. Analysts 8 must specify a unique name for each variable within an enterprise planning model, but may reuse names across different models. The formula allows analysts 8 to define a formula that specifies how enterprise planning and management performance system 3 should calculate the variable during the review and performance management stage for future and historical periods of the forecast, unless overridden by the actual override feature. The dimensionality of the variable definition allows analysts 8 to define the dimensions associated with the variable, where the dimensions define how enterprise planning and performance management system 3 generate and arrange multi-dimensional data cubes for storing information relevant to the variable entered during the contribution phase, which is described below. The multidimensional data structures of the model may, for example, be generated to have dimensionality that encompasses all of the dimensions specified for the defined output variables merging any redundant dimensions specified by multiple variable definitions. Each of the dimensions may be one of a predefined dimension type or a user-specified dimension type, where the dimension type defines the order by which enterprise planning and management performance system 3 calculates each dimension of the various types when performing calculations during the contribution and review and performance management stages, which is also described below.

To continue describing aspects of the variable definition, the dimension access control aspect of the variable definition allows analyst 8 to define which roles or individual users have access to the specified variable. The time aggregate formula allows analyst 8 to override the formula discussed above in instances where calculations of summary members (i.e., aggregated members) of the time hierarchy differ from leaf members (i.e., non-aggregated members) of the time hierarchy. The hierarchy aggregate formula allows analysts 8 to override the formula discussed above in instances where summary members of the hierarchy differ from leaf members of the hierarchy. The actual override feature for the variable definition allows analyst 8 to override the variable definition for historical periods of the forecast. Finally, the variable "member of" specification aspect allows analyst 8 to specify that a variable varies by another variable, instead of, or concurrently with, a dimension. For example, by defining that specific variables are a "Member of" a grouping, the resulting model automatically creates a variable dimension which has as members these variables.

Via the intuitive variable-based user interface, analysts 8 may assign roles to enterprise users, such as managers, supervisors, sales representatives, lab managers, or the like. Moreover, analysts 8 defined the organizational hierarchy having a plurality of nodes representing the roles and/or users and define coarse-grain access rights to portions of the enterprise model and associated planning data for each node, e.g., by specifying which portions of the planning model the roles and/or users are responsible for contributing or reviewing planning data. Moreover, analysts 8 defined the organizational hierarchy having a plurality of nodes representing enterprise units, such as cost centers, divisions, departments and the like. Each enterprise user may be designated as a contributor 6 that provides forecast planning data to enterprise planning and performance management system 3, a reviewer 7 that accepts or rejects contributions from contributors 6, or both. Contributors 6 and reviewers 7 may be authorized users within enterprise 4 or within other entities coupled to network 9, such as suppliers 14 and customers 16. In addition, access may be more finely controlled by allowing analysts 8 to specify which roles and/or users are allowed to access data associated with the defined variables of the model. Analysts 8 may also establish corporate targets for each node of the organization hierarchy.

Upon defining all variables pertinent to an enterprise planning model, analysts 8 cause enterprise planning and performance management system 3 to generate model data based on the variable definitions. Typically, this occurs automatically and requires little input from analysts 8. Enterprise planning and performance management system 3 may generate model data that defines various multi-dimensional data structures (e.g., multidimensional data cubes) as well as metadata associated these data structures, where the multi-dimension data structures have dimensionality to encompass the dimensions defined with respect to each variable in the order determined by each dimension's associated dimension type. Once generated and stored within enterprise planning and performance management system 3, the model data defines an enterprise planning model for use in subsequent planning sessions where contributors and/or reviewers enter contribution data relevant to the variables and/or review contribution data relevant to the variables.

Next, enterprise planning and performance management system 3 enters the contribution phase during which contributors 6 interact with enterprise planning and performance management system 3 to input contribution data relevant to one or more of the plurality of variables defined during the modeling stage. While described herein in reference to a financial planning activity, enterprise planning and performance management system 3 may be used for other types of planning and performance management, such as revenue forecasting, order forecasting, inventory forecasting, resource requirements estimation and the like, depending on the particular business being carried out within enterprise 4. Enterprise planning and performance management system 3 may also be used for other types of planning and performance management, including marketing campaigns, retail outlet launches, or any other type of business planning.

During the review and performance management phase, enterprise planning and performance management system 3 automates the reconciliation of the contribution data with the corporate targets provided by analysts 8. In one example, enterprise planning and performance management system 3 operates in accordance with the defined model to provide a hierarchical planning process having multiple reconciliation levels. As each of contributors 6 provides his or her contribution data, enterprise planning and performance management system 3 may automatically aggregate the contribution data across enterprise 4 in real-time, and provides access to the aggregated data to reviewers 7 associated with higher levels of enterprise 4.

In this example, upon receiving contribution data from contributors 6, enterprise planning and performance management system 3 identifies all higher levels of the organizational model affected by the newly received contribution data, and calculates new aggregate totals at each level in real-time. Depending on the calculation required, enterprise planning and performance management system 3 may perform the calculation according to the formula, which is sometimes referred to as the "main formula" or "default formula," the time aggregate formula, the actuals formula, or the hierarchy aggregate formula defined during the modeling stage and incorporated into the model during generation of the enterprise planning model. The actual or future indicator may specify which of these calculations to perform based on whether the variable was specified as actual or future, which is also incorporated into the model during the modeling stage.

Consequently, reviewers 7 view aggregated contribution data across enterprise 4 in real-time during the enterprise planning session. At each level, enterprise planning and performance management system 3 ensures that reviewers 7, as defined by the nodes of the enterprise model, reconcile the target data with the forecast data. Each reviewer 7 may, for example, reject or accept changes to the contribution data in view of corporate targets provided by analysts 8. This process continues until the contribution data, (e.g., activity data and event data), is ultimately approved by the highest level of the organizational hierarchy, thereby ensuring that the contribution data from contributors 6 reconciles with corporate targets provided by analysts 8. During this process, any of reviewers 7 may be assigned the role of contributor and, therefore, may also enter contribution data during the review process.

In this manner, enterprise planning and performance management system 3 enables organizations to reconcile corporate models and organizational targets with detailed forecasts, and provides a platform that delivers collaborative, real-time planning and performance monitoring capabilities without requiring offline consolidation and aggregation of forecasts. The architecture of enterprise planning and performance management system 3 can readily scale to thousands of users. In addition, the intuitive variable-based model building techniques ease the use of complex planning software within large organizations by enabling analysts 8 to quickly build enterprise planning models from a variable perspective. Because most analysts 8 focus on variables, such as revenue, number of employees, costs, income, and the like, instead of data dimensions or even varying hierarchies of nodes, the variable-based techniques described below in more detail facilitate the building of models by those analysts 8 unfamiliar with complicated conventional modeling processes. By focusing modeling building on variables, analysts 8 may more intuitively build models that reflect their inherent understanding of enterprise 4 and desire to achieve specific goals, which most variables represent. Thus, variable-based modeling techniques may ensure a more precise model because analysts 8 may more readily and intuitively understand the modeling building process.

As demonstrated below, the variable-based user interface may be generally "friendlier" and less intimidating to a user than an interface requiring the user to define multi-dimensional data cubes from the perspective of the organizational hierarchy. In addition, variable-based modeling techniques described herein may automatically generate model data based on these more intuitive variables without requiring significant interaction by analysts 8. This may allow analysts 8 to possibly avoid complicated and unintuitive procedures otherwise required by conventional enterprise planning and performance management systems.

Enterprise users, such as contributors 6, analysts 8 and reviewers 7, may use a variety of computing devices to interact with enterprise planning and performance management system 3 via network 9. For example, an enterprise user may interact with enterprise planning and performance management system 3 using a laptop computer, desktop computer, or the like, running a web browser, such as Internet Explorer™ from Microsoft Corporation of Redmond, Wash.

Alternatively, an enterprise user may use a personal digital assistant (PDA), such as a Palm™ organizer from Palm Inc. of Santa Clara, Calif., a web-enabled cellular phone or similar device. Network 9 represents any communication network, such as a packet-based digital network like the Internet. In this manner, system 2 can readily scale to suit large enterprises. The enterprise users may directly access enterprise planning and performance management system 3 via a local area network, or may remotely access enterprise planning and performance management system 3 via a virtual private network, remote dial-up, or similar remote access communication mechanism.

Figure 2:
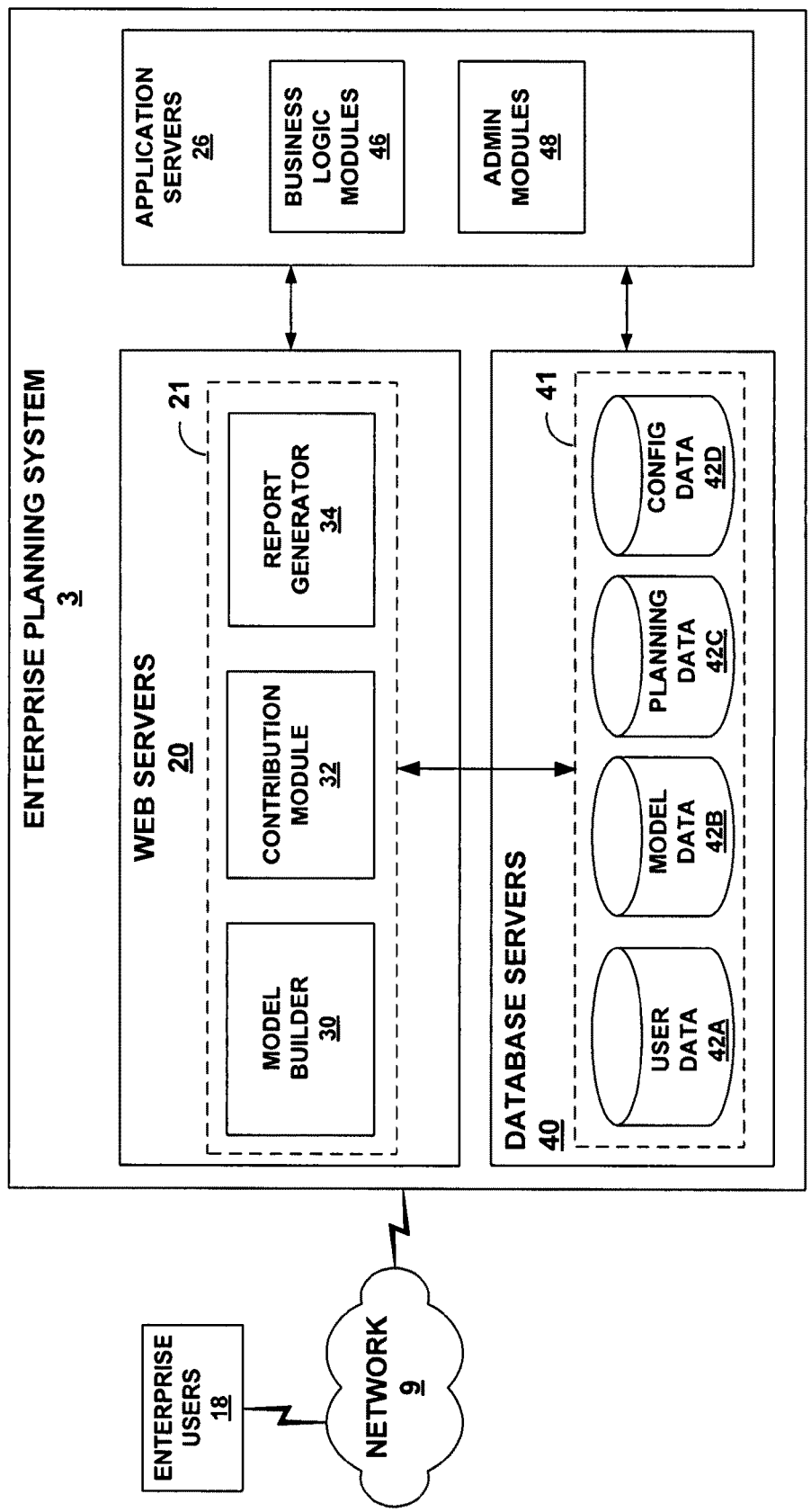
FIG. 2 is a block diagram illustrating one example embodiment of an enterprise planning and performance management system.

FIG. 2 is a block diagram illustrating one example embodiment of enterprise planning and performance management system 3. In the illustrated embodiment, enterprise planning and performance management system 3 includes web servers 20, application servers 26, and database servers 40.

Web servers 20 provide an interface for communicating with enterprise user 18 via network 9. Web servers 20 execute web server software, such as Internet Information Server™ from Microsoft Corporation, of Redmond, Wash. As such, web servers 20 provide an environment for interacting with contributors 6, analysts 8 and reviewers 7 according to software modules 21, which include model builder 30, contribution module 32 and report generator 34.

Software modules 21 may comprise Lotus scripts, Java scripts, Java Applets, Active Server Pages, web pages written in hypertext markup language (HTML) or dynamic HTML, Active X objects, .Net and other suitable modules. Web servers 20 serve up web pages defined by software modules 21, and communicate the web pages to computing devices of enterprise users 18. The web pages may include static media, such as text and graphic imagery, as well as conventional input media such as text entry boxes, radio buttons, drop-down menus and the like, for receiving information from enterprise users 18.

Software modules 21 interact with database servers 40 to access enterprise data 42 including user data 42A, model data 42B, planning data 42C, and configuration data 42D. Enterprise data may be stored in a number of different forms including one or more data storage files, or one or more database management systems (DBMS) executing on one or more database servers. The database management systems may be a relational (RDBMS), hierarchical (HDBMS), multidimensional (MDBMS), object oriented (ODBMS or OODBMS) or object relational (ORDBMS) database management system. Furthermore, although illustrated separately, enterprise data 42 could be combined into a single database or other data storage structure. Enterprise data 42 could, for example, be implemented as a single relational database, such as SQL Server™ from Microsoft Corporation.

User data 42A stores information for each of users 18, including the name, email address, and other contact information for the user. Model data 42B stores the enterprise planning models defined by analysts 8 via the variable-based user interface. For example, model database 42B stores information that defines the reconciliation process developed by analysts 8, including the number of reconciliation levels, the various "nodes" in the hierarchy, and the contributor 6 associated with each node. Planning data 42C stores the actual contribution data for each of the nodes, and configuration (CONFIG) data 42D stores basic configuration data for enterprise planning and performance management system 3.

Application servers 26 provide an operating environment for execution of business logic modules 46, which provide functionality for accessing and processing the data stored within databases 42 in response to software modules 21. In particular, business logic modules 46 comprise software routines for implementing the enterprise planning functions, and are invoked by software modules 21. Application servers 26 may also provide an operating environment for execution of administration modules 48, which comprise software routines for carrying out various administrative tasks within the enterprise planning and performance management system 3.

Referring again to software applications 21, model builder 30 includes one or more software modules for creating enterprise planning models for enterprise 4. In particular, via these software modules, model builder 30 presents the variable-based user interface discussed briefly above and in more detail below in reference to FIGS. 4A-4F. Via this user interface, model builder 30 allows analysts 8 to define one or more variables pertinent to the planning and performance management process. In one configuration, model builder 30 may retrieve various aspects of the variable definitions from an enterprise resource planning (ERP) database (not shown). In another configuration, model builder 30 may allow analyst 8 to import various aspects of the variable definitions, such as the formulas, from other programs, such as Excel or other enterprise planning and performance management systems, and incorporate those variable definitions into and present them within the user interface.

Once all variables have been defined, model builder 30 may generate, and in some instances automatically generate, model data based on the one or more variable definitions and store the model data to model data 42B. Model data 42B maps contribution data into multi-dimensional data cubes of planning data 42C, which is a repository for the planning data, or contribution data, provided by contributors during a subsequent enterprise planning session. For example, a form may be used to capture contribution data related to a variable, and that data may be mapped into one or more dimensions within planning data 42C. Model builder 30 stores within model data 42B the variable definitions and the forms for capturing the contribution data relevant to a particular variable.

Model builder 30 also allows the organization to define a number of mechanisms for automating the planning process and ensuring that the contributors 6 submit their respective contribution data timely and that the contribution data quickly moves through the defined review and performance management stages. For example, using model builder 30, the analysts 8 can define timers for triggering electronic mail messages (emails) to remind the contributors 6 to access enterprise planning system 3 and submit a particular set of contribution data.

Contribution module 32 includes software modules for presenting the forms to enterprise users 18 designated as contributors 6, and for capturing contribution data from the contributors 6. In one embodiment, contribution module 32 includes software modules for presenting the enterprise planning process to a user 18 via a series of customized planning windows. Contribution module 32 captures and aggregates the contribution data across enterprise 4 in real-time, and provides access to the aggregated data to reviewers 7 associated with higher levels of enterprise 4.

Report generator 34 includes analytical software modules that generate enterprise planning reports based on the contribution data received from contributors 6 and stored within planning data 42C. In particular, the analytical software modules allow users 18, such as analysts 8 and reviewers 7, to formulate complex queries for generating reports and performing other data analysis functions on the current data of the enterprise model. These software modules may be web-based modules having a browser interface, or may be stand-alone executable programs.

The variable-based modeling techniques described herein may be performed on any computer having a processor executing instructions stored to a computer readable medium. The processor may exist within enterprise planning system 3, e.g., within web servers 20 to execute instructions. Via execution of the software instructions, the processor may present a variable-based user interface for defining a plurality of variable definitions and generate model data corresponding to these variable definitions.

Figure 3:
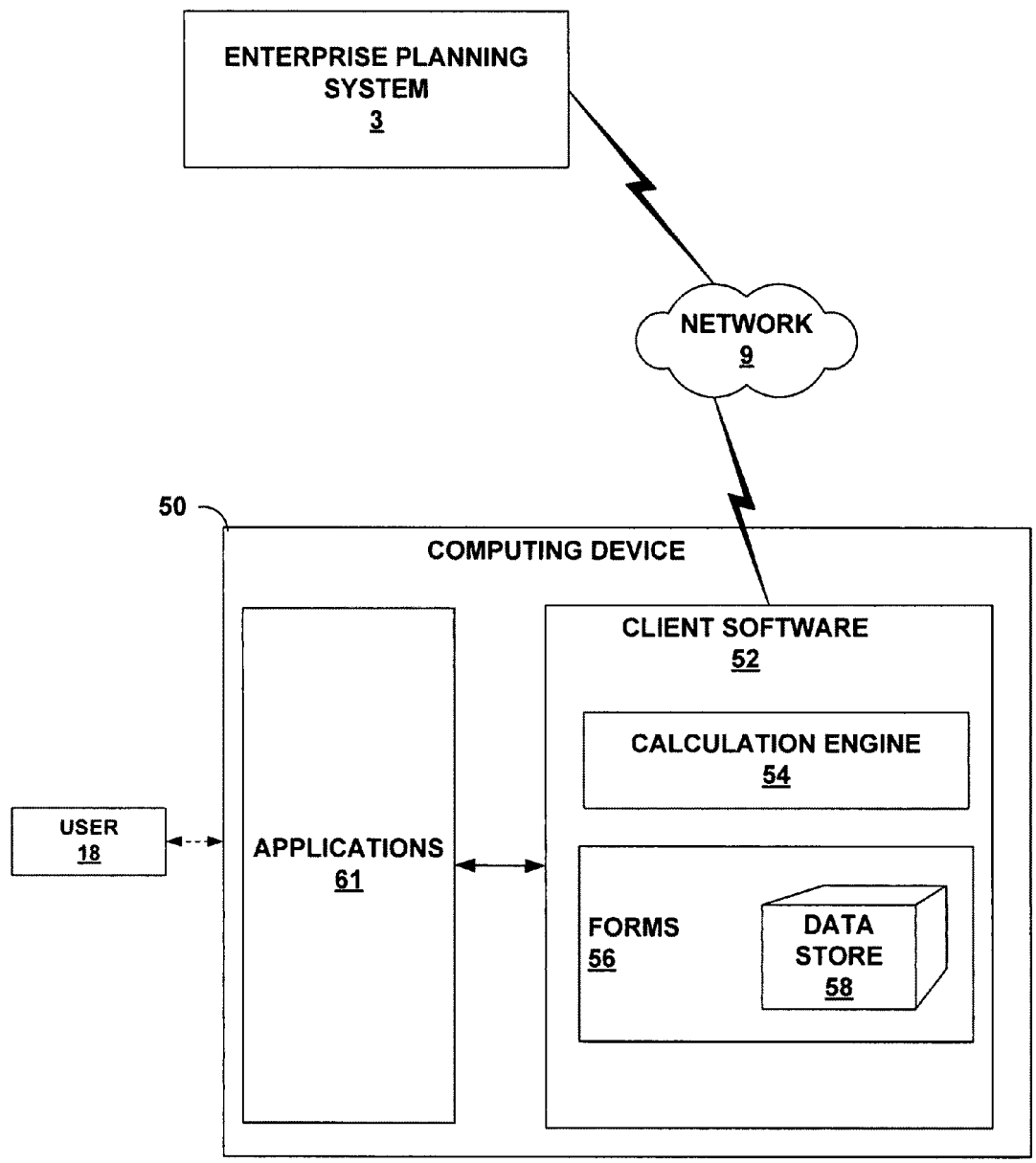
FIG. 3 is a block diagram illustrating an exemplary computing device, including various software modules executing thereon, when operated by a user, such as a contributor or a reviewer.

FIG. 3 is a block diagram illustrating an exemplary computing device 50, including various software modules executing thereon, when operated by a user 18, such as a contributor 6 or a reviewer 7. In the exemplary embodiment, computing device 50 includes client software 52, calculation engine 54, forms 56 and data store 58. When a user 18 directs computing device 50 to access enterprise planning and performance management system 3, calculation engine 54, and forms 56 are downloaded and installed within client software 52. Alternatively, these software components may be previously installed to computing device 50. Computing device 50 also includes software applications 61, which, for example, may comprise email applications, such as Microsoft Office, and other email, word processor, work management, and similar applications. In another embodiment, enterprise planning system 3 operates according to a "thin client" architecture in which minimal software components are installed on computing device 50 and instead execute remotely on servers of the enterprise planning system.

In the example architecture of FIG. 3, e.g., a "thick client" architecture, enterprise planning and performance management system 3 may utilize a "cut-down" process by which the multidimensional data store is "sliced" and delivered to each user 18 in accordance with the enterprise planning model defined previously via the variable-based user interface. During this process, enterprise planning and performance management system 3 identifies areas of the defined model to which users 18 are assigned, either as contributors or reviewers, and "slices" the data store based on the assignments. When a given user 18 logs in and proceeds with a subsequent enterprise planning session, enterprise planning and performance management system 3 communicates the respective data slice to the respective computing device 50, where it is stored in data store 58. In this fashion, enterprise planning and performance management system 3 need not communicate the entire model to each of users 18, thereby reducing communication time as well as resource requirements. Instead, each user 18 only receives information relevant to their respective portion of the planning process as defined via the dimension control aspect of the plurality of variable definitions.

To interact with enterprise planning and performance management system 3, each of contributors 6 uses client software 52, such as a web browser or other software module (e.g., a specialized spreadsheet application), to interact with forms 56 to provide respective contribution data relevant to each of their approved variables via the enterprise planning process. Forms 56 may receive the contribution data and store the data to data store 58. Each user 18 may also view the dynamic changes that occur as each new piece of data is input. Because calculation engine 54 is resident within client software 52, the cell entries do not have to be resubmitted to enterprise planning and performance management system 3, recalculated, and then re-posted to the client software 52 via network 9. If the contributor 6 wishes to end the planning session, but has not finished the process, the contributor 6 can save forms 56 to data store 58, and/or save it back to enterprise planning and performance management system 3. In this way, contributor 6 has the ability to save their work locally and work off-line or come back to their work at a later time, as well as save their work to the central server if desired.

When contributor 6 wishes to continue with enterprise planning and performance management, he or she can access enterprise planning and performance management system 3, at which time the appropriate forms 56 and data store 58 will be loaded in client software 52 for further editing. When contributor 6 completes this process, contributor 6 can submit the data to enterprise planning and performance management system 3, where it may then be aggregated across enterprise 4 and viewed by reviewers 7 and/or analysts 8 associated with higher levels of enterprise 4.

In similar fashion, each of reviewers 7 interacts with enterprise systems 3 via client software 52 executing upon his or her remote computing device 50. Each reviewer 7 may reject or accept the contribution data. This process continues until the contribution data is ultimately accepted by reviewers 7 associated with the highest level of the organizational hierarchy, thereby ensuring that the data from the contributors reconciles with corporate targets.

FIGS. 4A-4F are screenshots illustrating different portions of an exemplary variable-based user interface 62 presented by enterprise planning and performance management system 3 of FIG. 2 during the modeling stage. Variable-based user interface 62 allows a user to define a plurality of variables to be used in the subsequent enterprise planning process, and then provide variable definitions that allow model data to be generated from the perspective of these variables. In one embodiment, enterprise planning and performance management system 3 may be viewed as providing a web-based planning portal through which a user, such as user 18 of FIG. 2 interacts. The planning portal may present a spreadsheet similar to that shown in FIGS. 4A-4F.

In the example shown in FIGS. 4A-4F, user 18 may interact with a spreadsheet interface, such as an interface provided by Microsoft's Excel spreadsheet program, to provide the variable definitions. In these embodiments, enterprise planning and performance management system 3 may provide one or more templates that enables the variable-based modeling discussed herein, whereupon user 18 opens the spreadsheet program and loads the template. Once loaded, user 18, or more particularly, users 18 designated as analysts 8, defines a plurality of variables pertinent to the subsequent planning and performance management process. Once finished specifying the plurality of variables, analyst 8 may cause the spreadsheet program to load the plurality of variable definitions into enterprise planning and performance management system 3, which, possibly automatically, generates the model data and stores the model data to model data 42B, thereby defining the enterprise planning model for use in controlling the subsequent enterprise planning sessions, discussed above.

Figure 4A:
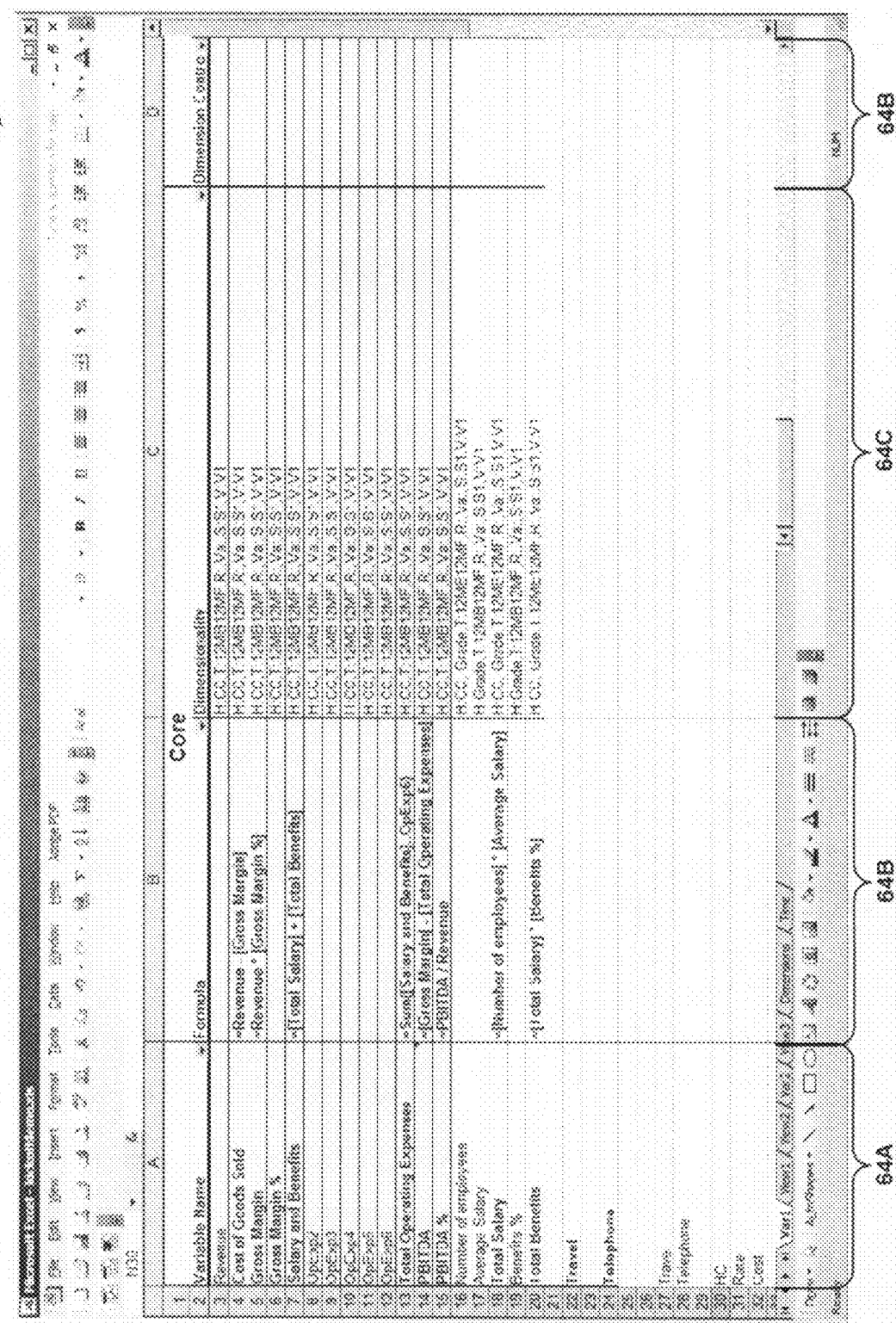
FIGS. 4A-4F are screenshots illustrating an exemplary variable-based user interface presented by the enterprise planning and performance management system of FIG. 2.

As shown in FIG. 4A, variable-based user interface 62 includes a plurality of rows and a plurality of columns 64A-64D. In this example, each of the rows contains one variable definition. Column 64A represents the variable name input area of variable-based user interface 62, where each cell of column 64A allows analyst 8 to specify a variable name for an associated one of the plurality of variable definitions. Column 64B represents the formula input area of variable-based user interface 62, where each cell of column 64A allows analyst 8 to specify a formula for an associated one of the plurality of variable definitions. Column 64C represents the dimensionality input area of variable-based user interface 62, where each cell of column 64C allows analyst 8 to specify one or more dimensions for an associated one of the plurality of variable definitions. Column 64D represents the dimension control input area of variable-based user interface 62, where each cell of column 64D allow analyst 8 to specify a dimension control for an associated one of the plurality of variable definitions.

As further shown in FIG. 4A, analyst 8 has already populated variable-based user interface 62 with a plurality of variable definitions. In particular, analysts 8 have specified variable names in column 64A with a "Revenue," "Cost of Goods Sold," "Gross Margin," "Gross Margin %," and "Salary and Benefits" variable names, to name a few. Focusing on the variable definition named "Cost of Goods Sold," analyst 8 also specified, within the "Cost of Goods Sold" variable definition of row 4, a "=Revenue−[Gross Margin]" formula in column 64B. This formula expresses how the "Cost of Goods Sold" variable is derived from other variables, i.e., the "Revenue" variable definition of row 3 and the "Gross Margin" variable definition of row 5. Analyst 8 may specify other types of formulas not shown in FIG. 4A and user interface 62 may support these other formulas. Exemplary formulas may include typical formulas found in conventional spreadsheet applications, such as the "Sum( )" and "lookup( )" formulas supported by Microsoft's Excel, conditional IF-THEN-ELSE statements, formulas that reference other modules of the model, cross-dimension formula, filtering formulas, time-related formulas, financial formulas, such as a straight-line depreciation formula, and complex mathematical formulas, such as a log formula.

Analyst 8 further specified a dimensionality of "H:CC,T:12MB12MF,R:,Va:,S:S1,V:V1" within column 64C for the "Cost of Goods Sold" variable definition of row 4. This dimensionality expresses that the "Cost of Goods Sold" variable should vary by a cost center (CC) dimension of dimension type hierarchy (H), a 12 month backward/12 month forward (12MB12MF) dimension of dimension type time (T), a scenario 1 (S1) dimension of dimension type scenario (S), and a version 1 dimension (V1) of dimension type version (V). The "Cost of Goods Sold" does not include a dimension of record dimension type (R) nor a dimension of dimension type 'variable dimension' (Va). In some embodiments, analyst 8 may specify subset dimensions, such as a "H:CC:Sales" subset dimension, where the "Sales" dimension is a subset of the cost center (CC) dimension. Although shown as text for purposes of example, the dimensionality within column 64C may be represented by graphical icons or other indicia.

By specifying the dimensions of the "Cost of Goods Sold" variable definition, analyst 8 indicates to enterprise planning and management system 3 how to store information related to the "Cost of Goods Sold" variable in subsequent planning sessions involving contributors and reviewers. By specifying the dimension type associated with each dimension, analysts 8 may define how enterprise planning and performance management system 3 builds model data. In particular, the dimension type determines the calculation priority assigned to the dimensions of that type within the model data generated by enterprise planning and performance management system 3.

Although not yet specified by analyst 8 in this example, a dimension control may be specified for the respective variable definitions of each cell in column 64D. Dimension control may be necessary when a variable does not vary by all the combinations of the members of the dimensions specified in the respective cells of dimensionality column 64C. A dimension control may function in a way analogous to access tables in conventional enterprise planning and performance management systems; however, these conventional systems are not variable-based, and therefore, may be complex and difficult for typical financial analysts to understand.

In general, the dimension control may be a many to many dimension control or a many to (nearly) one dimension control. For example, in a sales module a many-to-many "products:channel" dimension control may exist. Given the following table 1, analysts 8 may find it necessary to specify this many-to-many "products:channel" dimension control:

TABLE 1

|      | Channel1 | Channel2 | Channel3 | ALL CHANNELS |
|------|----------|----------|----------|--------------|
| Pdt1 | Yes      | Yes      | No       | ?            |
| Pdt2 | Yes      | Yes      | No       | ?            |
| Pdt3 | Yes      | Yes      | No       | ?            |
| Pdt4 | Yes      | Yes      | No       | ?            |

TABLE 1-continued

|  | Channel1 | Channel2 | Channel3 | ALL CHANNELS |
|---|---|---|---|---|
| Pdt5 | Yes | No | No | ? |
| PG A | Yes | Yes | No | ? |
| Pdt6 | Yes | No | Yes | ? |
| Pdt7 | Yes | No | Yes | ? |
| Pdt8 | Yes | No | Yes | ? |
| PG B | Yes | No | Yes | ? |
| Pdt9 | Yes | No | No | ? |
| Pdt10 | Yes | No | No | ? |
| Pdt11 | Yes | No | No | ? |
| Pdt12 | Yes | No | No | ? |
| PG C | Yes | No | No | ? |
| Pdt13 | No | Yes | Yes | Yes |
| ALL PRODUCTS | Yes | No | ? | ? |

The items in bold in the above table show how analyst 8 may have wanted to input the dimension control, e.g., Channel 1 can sell all products except product 13, Channel2 can sell only products in product group A (PGA) but not product 5 (pdt5), Channel3 can sell only products in product group B (PGB), and All Channels can sell product 13 except for Channel 1. The entries in Table 1 may be automatically derived from the variables based on specified rules, may be directly entered, or a combination thereof.

As an example of a many-to-(nearly) one dimension control, assume the following table 2 graphically represents how a many-to-(nearly) one "Employee:Cost Center:Time" dimension control may be summarized:

TABLE 2

|  | Period1 | Period2 | Period3 | Period4 | Period5 | Period6 |
|---|---|---|---|---|---|---|
| Name1 | CC1 | CC1 | CC1 | CC1 | CC1 | CC1 |
| Name2 | CC1 | CC1 | CC1 | CC1 |  |  |
| Name3 |  |  | CC1 | CC1 | CC1 | CC1 |
| Name4 | CC1 | CC1 | CC1 | CC2 | CC2 | CC2 |
| Name5 | CC1-50% | CC1-50% | CC1-50% | CC1-50% | CC1-50% | CC1-50% |
| Name5' | CC2-50% | CC2-50% | CC2-50% | CC2-50% | CC2-50% | CC2-50% |

Here, the many-to-many dimension control would be unsuitable. In ordinary business planning, employees "Name1"-"Name5" are expected to stay working for the same cost center, i.e., "CC1" or "CC2." However, analysts 8 may plan events relating to the employees, such as new employees joining, employees leaving, employees transferring cost centers, and more than one cost center sharing a single employee, as in employee "Name5"/"Name5'." Thus, analyst 8 may define the "Employee:Cost Center:Time" dimension control such that "Name1" is in "CC1" for each planning period shown, i.e., Period1-Period6, "Name2" is in "CC1" but leaves the company in "Period5," "Name3" joins the company working for "CC1" from "Period3," "Name4" transfers from "CC1" to "CC2" in "Period4," and "Name5" works 50% for "CC1" and 50% for "CC2." The bold represents that the owner of "CC2" has only read access to "Name5" data, which is also specified within the "Employee:Cost Center:Time" dimension control. Clicking on dimension control 64D, for example, may provide a sub-screen for specifying the example information listed above.

Finally, analyst 8 may specify a time-driven dimension control using data, including actual data, which is discussed in more detail below, in the model. To continue the above example from table 2, analyst 8 may specify a dimension control from the defined variables which show the start and end dates for the cost center and company. In some instances, analysts 8 may be unable to determine the dimension control due to lack of information concerning various particulars of the enterprise, and in these instances, a contributor 6 or reviewer 7 may specify a dimension control. Thus, for the variable definitions shown in FIG. 4A, analysts 8 most likely are unable to assign a dimension control in column 64D for these reasons; however, in a subsequent planning session, contributors 6 or reviewers 7 may specify a dimension control.

Figure 4B:
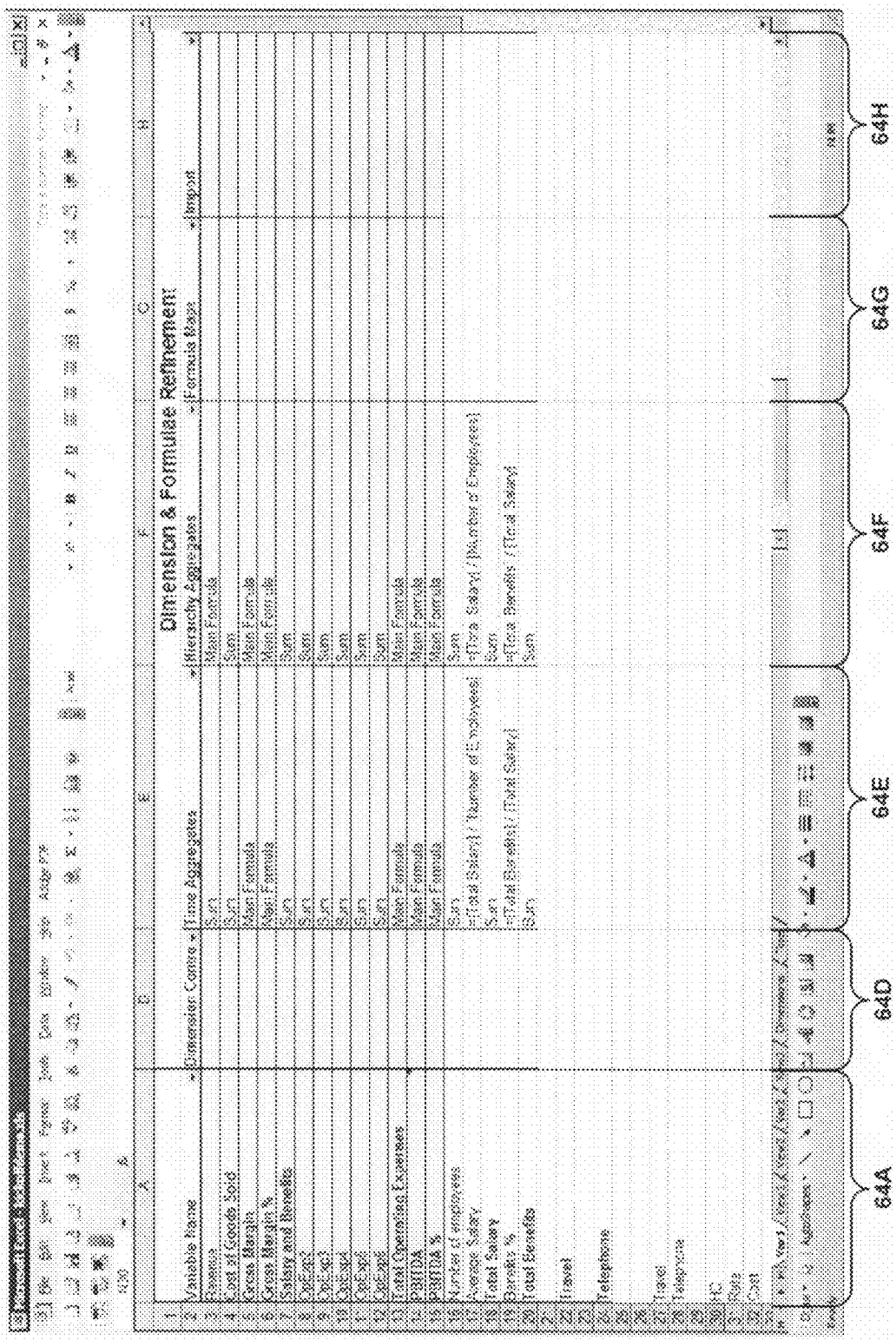

FIG. 4B shows another screenshot of variable-based user interface 62, where analyst 8 has advanced the example spreadsheet interface to the right via a conventional scroll bar found in the lower right portion of variable-based user interface 62 to show additional columns 64E-64H. Variable-based user interface 62 keeps variable name column 64A positioned as the far left column so that analysts 8 may quickly determine the particular variable definition to which the various aspects coincide. Because of this feature, variable name column 64A may be referred to as a "variable spine," as it remains viewable throughout specifying the plurality of variable definitions, and therefore represents the "spine," or supporting column, of the plurality of variable definitions. Column 64D is shown in FIG. 4B to illustrate the continuity of the screenshot of variable-based user interface 62 with that of FIG. 4A.

As shown in FIG. 4B, column 64E represents the time aggregate input area of variable-based user interface 62, where each cell of column 64E allows analyst 8 to specify a time aggregate formula for an associated one of the plurality of variable definitions. Column 64F represents the hierarchy aggregate input area of variable-based user interface 62, where each cell of column 64F allows analyst 8 to specify a hierarchy aggregate formula for an associated one of the plurality of variable definitions. Column 64G represents a "formula maps" input area of variable-based user interface 62, where each cell of column 64G allows analyst 8 to specify a formula map for an associated one of the plurality of variable definitions. Column 64H represents an import input area of variable-based user interface 62, where each cell of column 64H allows analyst 8 to specify an import source for an associated one of the plurality of variable definitions.

Focusing again on the example variable definition named "Cost of Goods Sold," analyst 8 also specified, within the "Cost of Goods Sold" variable definition of row 4, a "Sum" time aggregate formula in column 64B. Analyst 8 may specify other time aggregate formulas, such as a specific formula, an "Aggregation" formula, a "Main Formula," an "Average" formula, a "First Period" formula, a "Last Period" formula, a "N/A" indicator, and a "Null" indicator. Each of these formula, except for the specific formula, may be referenced by analyst 8 via a handle, such as "Sum," "Aggregation," and "Main Formula," as shown in FIG. 4B.

This "Sum" formula expresses that enterprise planning and performance management system 3 should generate model data to indicate that the model should calculate the "Cost of Goods Sold" variable according to a predefined "Sum" formula over the time dimension, instead of according to the formula defined in column 64B for the "Cost of Goods Sold" variable definition. If analyst 8 specified a specific formula, analyst 8 would enter a formula similar in format to that of the formula entered in a cell of formula column 64B of FIG. 4A. If the "Aggregation" formula were specified in this cell instead, the generated enterprise planning model should calculate the "Cost of Goods Sold" variable over its time dimension according to a predefined aggregation formula. If "Main Formula" were specified in this cell instead, the generated enterprise planning model should calculate the "Cost of Goods Sold" variable according to the formula specified in column 64B of the "Cost for Goods Sold" variable definition of row 4, for example. If the "First Period" formula were specified in this cell instead, the generated enterprise planning model should return the value of the "Cost of Goods Sold" variable for the first period of the aggregate time period being considered. If the "Last Period" formula were specified in this cell instead, the generated enterprise planning model should return the value of the "Cost of Goods Sold" variable for the last period of the aggregate time period being considered. If the "Cost of Goods Sold" did not contain a time dimension type, analyst 8 may specify that no time aggregate formula is required via the "N/A," or not available, indicator. If analyst 8 did not specify any indicator or specified a "Null" indicator, enterprise planning and management system 3 would not specify any model data pertaining to time aggregation for the "Cost of Goods Sold" variable.

Hierarchy aggregation formula column 64F may support similar formula specification as that of time aggregation formula column 64E. These formulas may act over the dimension of hierarchy dimension type specified in dimensionality column 64C, and provide similar overrides of the main formula specified in formula column 64B for the respective variable definitions. Although not described herein in significant detail to ease illustration, the invention should not be limited to strictly time aggregation formulas, but may include similar hierarchy aggregation formulas.

Formula map column 64G allows analyst 8 to specify a formula map file to be used with an input source. The formula map file defines a mapping between a variable definition present on another enterprise software system to the variable definition associated with the cell specifying the formula map in the current system, or enterprise planning and performance management system 3. Import source column 64H allows analyst 8 to specify an import source defining the source system for the variable definition to be imported. Specifying the import source may entail defining a particular location of the various aspects of the external variable definition. Import source column 64H may accept files in order to specify the import source.

Figure 4C:
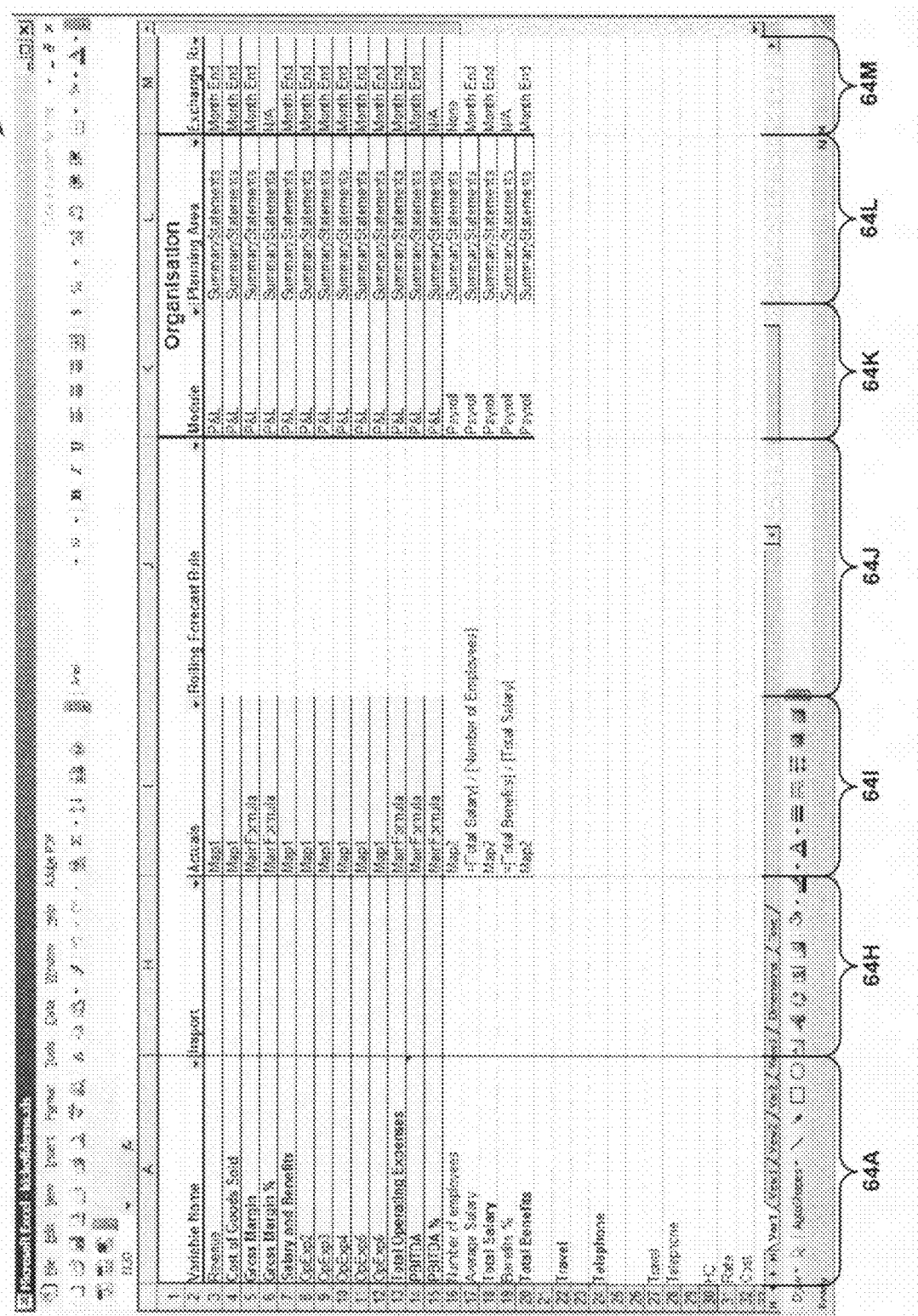

FIG. 4C shows another screenshot of variable-based user interface 62, where analyst 8 has again advanced the spreadsheet to the right to show additional columns 64I-64M. As described above, variable-based user interface 62 keeps the variable spine, or variable name column 64A, positioned as the far left column so that analysts 8 may quickly determine the particular variable definition to which the various aspects coincide. Column 64H is shown in FIG. 4C to illustrate the continuity of the screenshot of variable-based user interface 62 with that of FIG. 4B.

As shown in FIG. 4C, column 64I represents the "Actuals" input area of variable-based user interface 62, where each cell of column 64I allows analyst 8 to redefine a variable based on whether the variable is being used with respect to actual (historical) or future data. For example, column 64I allows the user to specify a different formula or calculation for the variable definition to be applied to historical periods of the forecast. As another example, the Actuals input area of column 64I may also be used to specify an input source software system from which to import the historical, i.e., actual, data to be used for the variable. In this manner, any optional formula and/or import specified in column 64I may override the formula specified in column 64B of the variable definition for historical periods within a forecast.

Column 64J represents a rolling forecast rule input area of variable-based user interface 62, where each cell of column 64J allows analyst 8 to specify a rolling forecast rule for an associated one of the plurality of variable definitions. Column 64K represents a module input area of variable-based user interface 62, where each cell of column 64K allows analyst 8 to specify a module to which an associated one of the plurality of variable definitions belongs. Column 64L represents a planning area input area of variable-based user interface 62, where each cell of column 64L allows analyst 8 to specify a planning area (e.g., a discrete model or collection of models) to which an associated one of the plurality of variable definitions belongs. Column 64M represents an exchange rate input area of variable-based user interface 62, where each cell of column 64M allows analyst 8 to specify an exchange rate for each of the corresponding plurality of variable definitions.

Typically, analyst 8 imports the historical data. Actuals column 64I allows analyst 8 to specify calculation of a forecast for future periods based on variable definitions defined for future periods. As another example, a "Unit Price" variable definition might calculate form the imported values for a "Revenue" and "Units Sold" variable definition in historic periods. Whereas in projected periods, the "Revenue" variable definition might represent a calculation of "Units Sold" and "Unit Price." Actuals column 64I enables these calculations and facilitates the variable-based modeling process.

In a budget, all time periods are typically future periods. However, in a forecast some of the time periods relate to historical data, such as the 12 months forward, 12 months backward dimension of dimensionality type time, described above. Typically, analyst 8 imports the historical data. Actuals column 64I allows analyst 8 to refine the definition of a variable for historic periods. For example, Actual column 64I can refer to a map (e.g. map1) that allows it to define how data can be imported from source systems specify mappings to source system. Alternatively, Actuals column 64I can define a formula to allow the value of the variable for historical periods to be calculated from the values of other variables. For example Average Salary=Total Salary/Number of Employees. As another option, Actuals column 64I can use the same formula that is being used to calculate future periods (i.e. MainFormula) without having to re-key it.

As shown in FIG. 4C, analyst 8 may specify "Main Formula" as an actual or future indicator for some of the variable definitions, such as the "Gross Margin" variable definition. The "Main Formula" specification indicates that, for historic and future periods in the resulting model, the model should calculate the variable definition having this indicator in the same manner, i.e., according to the main formula specified in column 64B. Analyst 8 may also specify a specific formula, such as "=[Total Salary]/[Number of Employees]" for the "Average Salary" variable definition of row 17. This enables analyst 8 to explicitly specify how the resulting model calculates actual, or historical, data for the corresponding variable definition. Actuals column 64I may also accept a "Null" indicator to suggest that no historical data exists for the corresponding variable definition. Variable definitions, such as a "Car Allowances" variable definition, typically do not require historical data, as these variable definitions are mostly forward looking.

Although not populated in the illustrated embodiment of FIG. 4C, rolling forecast rule column 64J allows analyst 8 to define default population rules in the event of rolling one forecast to the next forecast. Typically, as part of rolling one forecast to the next, the future periods of the new forecast are automatically populated with the data from the previous forecast according to the default population rules. Thus, rolling forecast rule column 64J enables analyst 8 to define such rules for each variable definition to ensure proper population of the new forecast upon rollover. In other words, this feature provides an automatic way of populating a new forecast period that is created upon rollover of a forecast, e.g., forecasting for a future time period that is not covered by the previous forecast. Examples include rules for using the same data from the previous forecast or the same data increased by a default percent.

Module column 64K accepts from analyst 8 a specification of the module within the resulting model to which the corresponding variable definition belongs. A module represents a collection of modeling objects, or, for example, variable definitions, dimensions, and hierarchies. Modules allow analyst 8 to define set groups of these modeling objects to ease understanding and use of the resulting model. Analyst 8 may define, port previous, and customize pre-existing, or built-in, modules, thereby possibly improving the quality of models built by analysts 8. The "P&L" and "Payroll" modules shown in FIG. 4C in column 64K represent exemplary profit and loss and payroll modules, under which a number of modeling objects reside.

Planning area column 64L accepts from analyst 8 a specification of a distinct area within the resulting model where the model calculates all values corresponding to the defined planning area consistently, i.e., the defined planning area always reflects the full impact of a change anywhere else in that area. In some instances, it is not necessary for calculations from one part of a model to be run through to another part of the model in real-time, and, in these instances, analyst 8 may define two or more planning areas to avoid calculating the impact across the entire model. For example, a cost center manager may have direct costs and allocated costs. If some of these costs are allocated on the basis of the manager's proportion of the total headcount, the manager's planned numbers would be changing every time a manager from any other cost center changed their planned headcount. This frustrating occurrence may be solved through the use of planning area column 64L by specifying distinct planning areas for each cost center manager. In some embodiments, analyst 8 may link two or more planning areas together, and such linking may reference data at the cell-level of granularity. Analyst 8 may also synchronize two or more defined planning areas together such that the resulting model refreshes any references between them according to a workflow process. This workflow process ensures that data from one synchronized planning area does not impact data in another synchronized planning area until it is appropriate to do so.

Exchange rate column 64M accepts from analyst 8 a specification of an exchange rate for a corresponding variable definition. Many enterprises, such as enterprise 4, may span multiple countries, and typically, managers prefer to plan in their local currency and also review their plans in the local currency of their reviewing unit and their ultimate head office. Exchange rate column 64M facilitates this feature by allowing analyst 8 to specify an exchange rate. The resulting model uses this specified exchange rate to get a converted currency from the local currency.

Figure 4D:
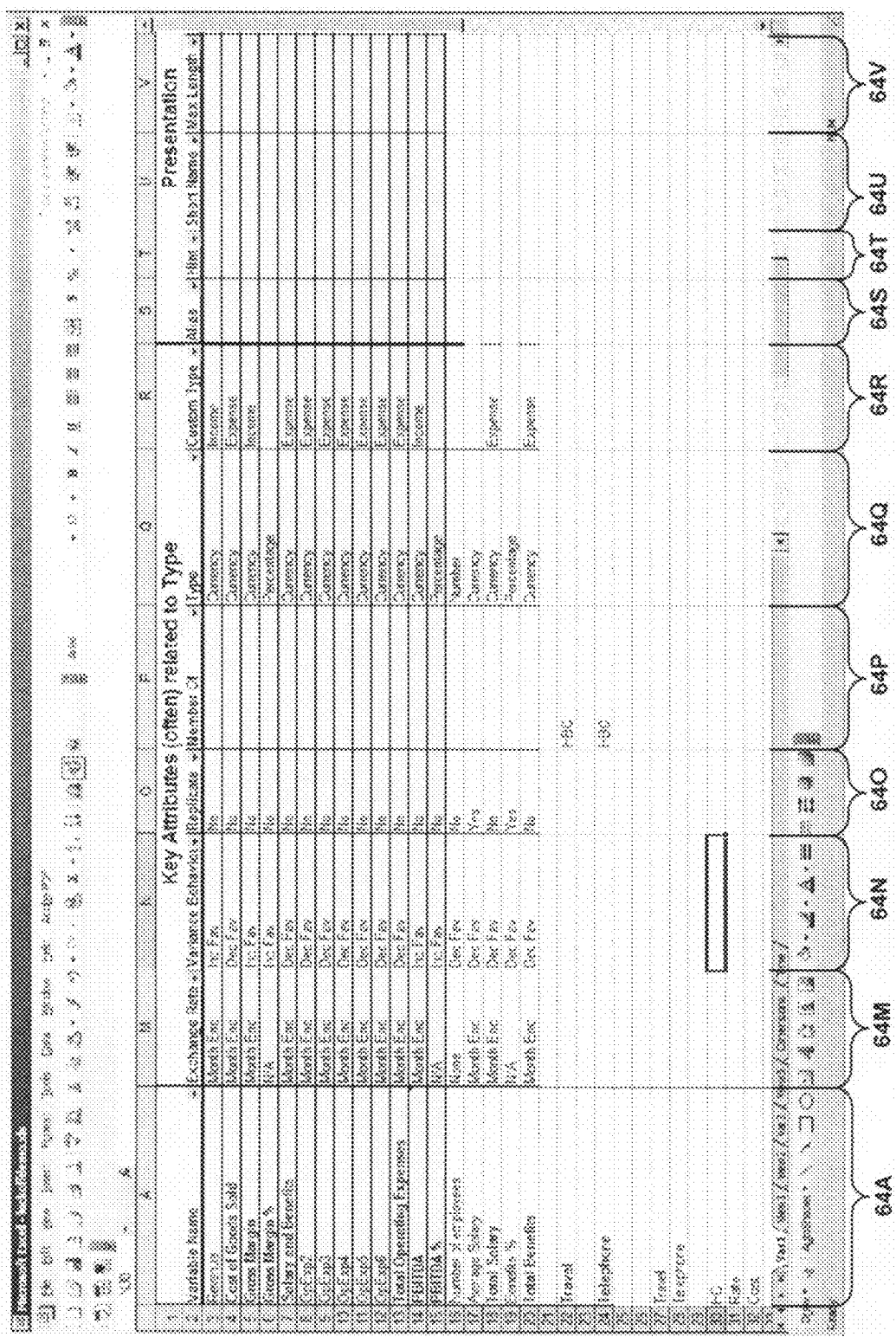

FIG. 4D shows another screenshot of variable-based user interface 62, where analyst 8 has advanced the spreadsheet to the right to show additional columns 64N-64V. As described above, variable-based user interface 62 keeps the variable spine, or variable name column 64A, positioned as the far left column so that analysts 8 may quickly determine the particular variable definition to which the various aspects relate. Column 64M is shown in FIG. 4D to illustrate the continuity of the screenshot of variable-based user interface 62 with that of FIG. 4C.

As shown in FIG. 4D, column 64N represents a variance behavior input area of variable-based user interface 62, where each cell of column 64N allows analyst 8 to specify a variance behavior for an associated one of the plurality of variable definitions. Column 64O represents a replicate input area of variable-based user interface 62, where each cell of column 64O allows analyst 8 to specify a replicate rule for an associated one of the plurality of variable definitions. Column 64P represents a "member of" input area of variable-based user interface 62, where each cell of column 64P allows analyst 8 to specify a calculation grouping by which an associated one of the plurality of variable definitions belongs. Column 64Q represents a variable data type input area of variable-based user interface 62, where each cell of column 64Q allows analyst 8 to specify a variable data type to which an associated one of the plurality of variable definitions belongs. Column 64R represents a custom type input area of variable-based user interface 62, where each cell of column 64R allows analyst 8 to specify a custom numerical type to which the corresponding plurality of variable definitions belongs. Column 64S represents an alias input area of variable-based user interface 62, where each cell of column 64S allows analyst 8 to specify an alias for an associated one of the plurality of variable definitions. Column 64T represents a hint input area of variable-base user interface 62, where each cell of column 64T allows analyst 8 to specify a hint for each of the plurality of variable definitions. Column 64U represents a short name input area of variable-based user interface 62, where each cell of column 64U allows analyst 8 to specify a short name for each associated one of the plurality of variable definitions. Column 64V represents a max length input area of variable-based user interface 62, where each cell of column 64U allows analyst 8 to specify a max length for each corresponding one of the plurality of variable definitions.

Continuing the above "Cost of Goods Sold" variable definition focus, analyst 8 has already specified a "Dec Fav" variance behavior in row 4 of variance behavior column 64N. The "Dec Fav" variance behavior indicates that a decrease in the "Cost of Goods Sold" is favored with respect to accounting/financial practices. Column 64N also accepts other inputs, such as "Inc Fav," "N/A," and "Null." The "Inc Fav" variance behavior indicates an increase in the associated variable definition value within the resulting model is favored with respect to accounting/financial purposes. An indicator of "N/A" for variance behavior indicates that variance behavior is not appropriate for the associated variable definition. The "Null" variance behavior indicates that analyst 8 does not want to account for variance within the resulting model, even though variance behavior may be possible for the associated variable definition. Variance behavior column 64N, therefore, allows analyst 8 to specify that the resulting model should show variance information relating to the plurality of variable definitions as either positive or negative depending on the variance behavior.

Replicate column 64O accepts from analyst 8 a specification of a replicate indicator for a corresponding variable definition. Some defined variables used in the calculation of others may have greater dimensionality (or more granular dimensionality), as shown by way of example in the following Table 3:

TABLE 3

| Variable | Formula | Replicate | Dimensionality |
|---|---|---|---|
| Units Sold | | No | cc.sales, pdt, channel, Time.Months, , , Scenarios |
| Unit Price | | Yes | pdt, Time.Months, , , Scenarios |
| Revenue | [Units Sold] * [Unit Price] | No | cc.sales, pdt, channel, Time.Months, , , Scenarios |

Here, the "Unit Price" abbreviated variable definition does not include the channel or "cc:sales" dimension even though the "Revenue" variable definition, which the resulting model calculates from the "Units Sold" variable, does. The "Yes" replicate indicator indicates that the resulting model should replicate values across the missing dimensions, or across the granularity. The "No" replicate indicator indicates that the resulting model should not replicate values in this manner.

"Member of" column 64P facilitates calculating a group of variables in the same way. Having a single variable spine, while possibly easing the modeling process, does not quickly enable analysts 8 to calculate a number of variables in the same manner. Without "Member of" column 64P, analyst 8 would have to enter complicated equations for each variable definition repeatedly so as to calculate, for example, telephone and travel costs. "Member of" column 64P accepts from analyst 8 a specification of a generalized equation by which the resulting model calculates all member variables. For example, travel and telephone variables of respective rows 22 and 24 are members of the HCB, or HeadCount-Based, grouping. For each of the travel and telephone variables, the resulting model calculates these variables according to a head-count based equation, where each employees respective travel and telephone costs are averaged and, next, multiplied by the number of employees. By defining that specific variables are a "Member of" HCB, the resulting model effectively creates a variable dimension which has as members these variables, i.e., travel and telephone. Within the model, HCB are then defined as varying by this dimension. When using such "Member Of" groupings, analyst 8 may define within column 64B the formula aspect of the variable definition using a "VarFromDimMem( )" function. These functions indicate that the resulting model should pull back the calculated head-count-based cost into the appropriate variable.

Variable data type column 64Q accepts from analyst 8 a specification of a variable data type for a corresponding variable definition. Typically, a number of the variables within enterprise 4 are merely numeric. However, some variables are of other data types, such as currency, percentage, controlled text, date, free form text, headers, integer, and number. As these are self-explanatory, they will not be discussed in detail herein. Variable data type column 64Q, therefore, allows analyst 8 to specify how data associated with the variable definition is stored and defined.

Custom type column 64R accepts from analyst 8 a shortcut, customizable specification for grouping and maintaining variable definitions. For example, analyst 8 may declare a custom type "income," where all variable definitions grouped under this custom type have the following attribute values:

TABLE 4

| Attribute | Value |
|---|---|
| Exchange Rate | Month Average |
| Time Summation | Aggregate |
| Hierarchy Summation | Aggregate |
| Variance Behaviour | Inc Fav |
| Type | Currency |

This is a shortcut in that analyst 8 may no longer have to manually assign all of the attributes, or aspects, of the variable definition defined by the custom type. Instead analyst 8 may assign the variable to the custom type, and the model is built according to the custom type. In some embodiments, after indicating that a variable belongs to a custom type, variable-based user interface 62 may automatically populate the various aspects defined by the custom type within their associated columns.

Alias column 64S accepts from analyst 8 an alias string for the associated variable. Hint column 64T accepts from analyst 8 a hint string that the model may provide when, for example, a contributor interacts with another user-interface via a subsequent enterprise planning session. Short name column 64T accepts from analyst 8 a short name string for the associated variable, where the short name allows analyst 8 to, for example, define acronyms, or other short names by which the variable may be accessed. Max length column 64V accepts from analyst 8 a maximum string length for data entry associated with the associated variable.

Figure 4E:
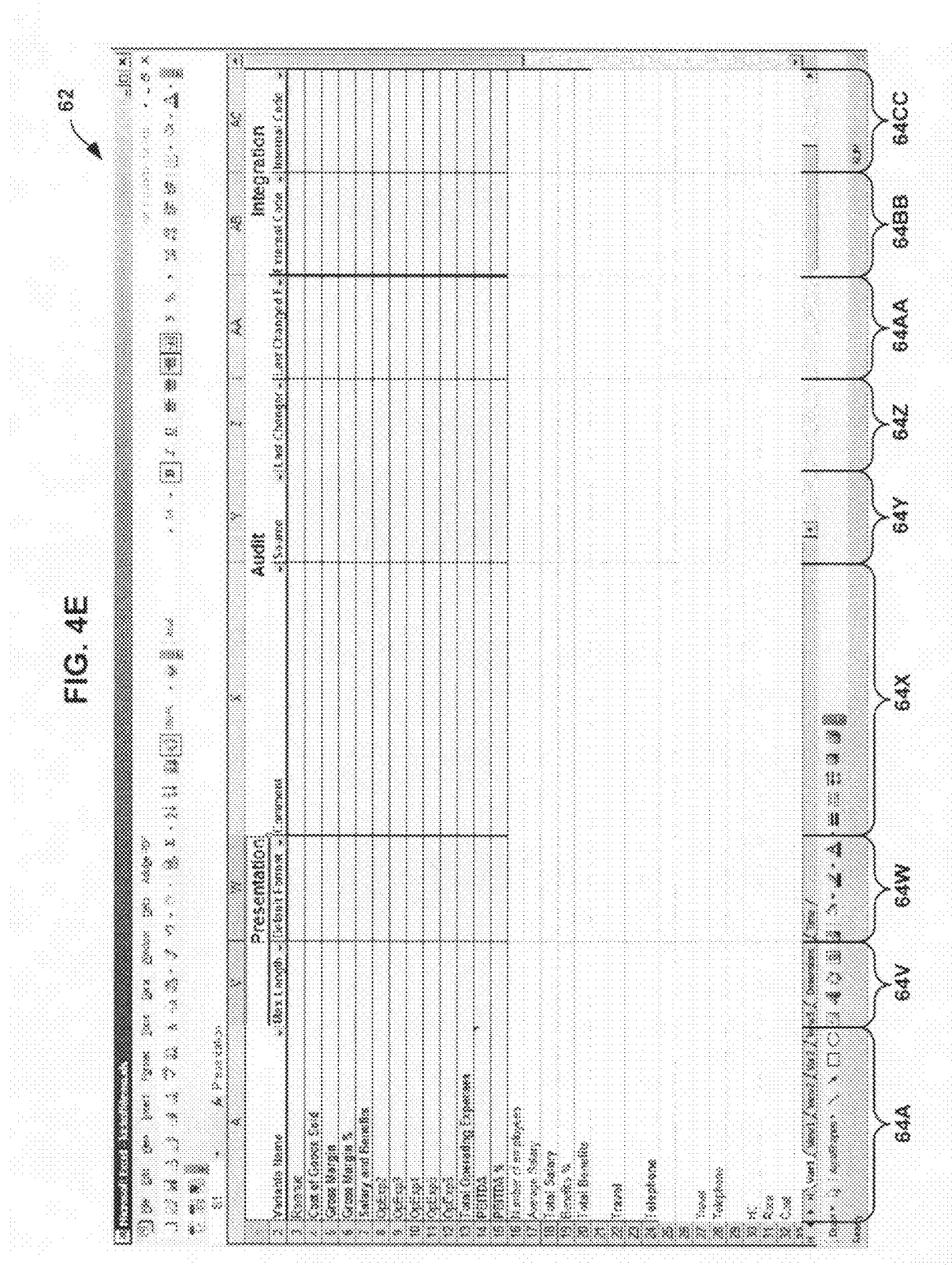

FIG. 4E shows another screenshot of variable-based user interface 62, where analyst 8 has advanced the spreadsheet to the right to show additional columns 64V-64CC. As described above, variable-based user interface 62 keeps the variable spine, or variable name column 64A, positioned as the far left column so that analysts 8 may quickly determine the particular variable definition to which the various aspects coincide. Column 64V is shown in FIG. 4D to illustrate the continuity of the screenshot of variable-based user interface 62 with that of FIG. 4D.

As shown in FIG. 4E, column 64W represents a default format input area of variable-based user interface 62, where each cell of column 64W allows analyst 8 to specify a default format for an associated one of the plurality of variable definitions. Column 64X represents a comment input area of variable-based user interface 62, where each cell of column 64X allows analyst 8 to specify a comment for an associated one of the plurality of variable definitions. Column 64Y represents a source input area of variable-based user interface 62, where each cell of column 64Y allows analyst 8 to specify a source of an audit of an associated one of the plurality of variable definitions. Column 64Z represents a last changed date input area of variable-based user interface 62, where each cell of column 64Z allows analyst 8 to specify a last changed date for an associated one of the plurality of variable definitions. Column 64AA represents a last changed by input area of variable-based user interface 62, where each cell of column 64AA allows analyst 8 to specify a user who last changed the associated one of the plurality of variable definitions. Column 64BB represents a external code input area of variable-based user interface 62, where each cell of column 64BB allows analyst 8 to specify an external code for each corresponding plurality of variable definitions. Column 64CC represents an internal code input area of variable-based user interface 62, where each cell of column 64CC allows analyst 8 to specify an internal code for each associated one of the plurality of variable definitions.

Default format column 64W accepts from analyst 8 a default format for presenting data related to the associated one of the plurality of variable definitions. Analyst 8 may specify a format, such as those commonly used for representing various currencies, financial figures, and the like. Comment column 64X accepts from analyst 8 a string representing a comment for the associated one of the plurality of variable definitions. Audit source column 64Y accepts input from analyst 8 defining a source (e.g., a user or department) responsible for the audit of data relating to each one of the plurality of variable definitions. Last changed column 64Z accepts from analyst 8 a date defining when the last change to the variable definition occurred. Last changed by column 64AA accepts from analyst 8 a user 18 who last changed the associated variable definition. User interface 62 may automatically populate inputs into both of columns 64Z and 64AA based on which user 18 logged into user interface 62. External code column 64BB accepts from analyst 8 a unique external code that clients of enterprise 4 may use to identify the variable. Internal code column 64CC accepts form analyst 8 a unique internal code that enterprise 4 uses to identify the variable.

Figure 4F:
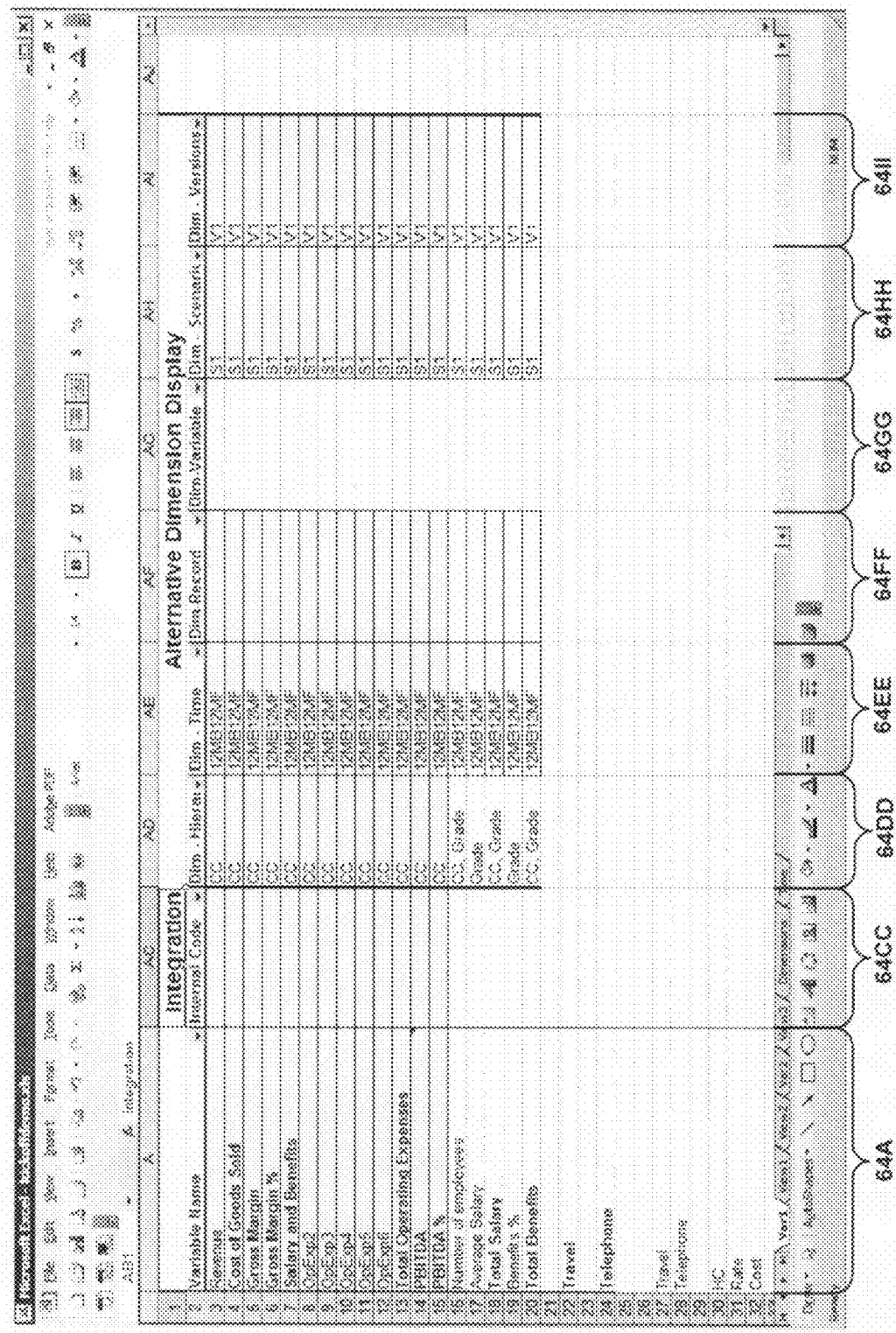

FIG. 4F shows another screenshot of variable-based user interface 62, where analyst 8 has advanced the spreadsheet to the right to show additional columns 64CC-64II. As described above, variable-based user interface 62 keeps the variable spine, or variable name column 64A, positioned as the far left column so that analysts 8 may quickly determine the particular variable definition to which the various aspects coincide. Column 64CC is shown in FIG. 4F to illustrate the continuity of the screenshot of variable-based user interface 62 with that of FIG. 4E.

As shown in FIG. 4F, column 64DD represents an alternative hierarchy dimension input area of variable-based user interface 62, where each cell of column 64DD allows analyst 8 to specify a hierarchy dimension for an associated one of the plurality of variable definitions in an alternative way to specifying it via dimensionality column 64C. Column 64EE represents an alternative time dimension input area of variable-based user interface 62, where each cell of column 64EE allows analyst 8 to specify a time dimension for an associated one of the plurality of variable definitions in an alternative way to specifying it via dimensionality column 64C. Column 64FF represents an alternative record dimension input area of variable-based user interface 62, where each cell of column 64FF allows analyst 8 to specify a record dimension for an associated one of the plurality of variable definitions in an alternative way to specifying it via dimensionality column 64C. Column 64GG represents an alternative variable dimension input area of variable-based user interface 62, where each cell of column 64GG allows analyst 8 to specify a variable dimension for an associated one of the plurality of variable definitions in an alternative way to specifying it via dimensionality column 64C. Column 64HH represents an alternative scenario dimension input area of variable-based user interface 62, where each cell of column 64HH allows analyst 8 to specify a scenario dimension for an associated one of the plurality of variable definitions in an alternative way to specifying it via dimensionality column 64C. Column 64II represents an alternative version dimension input area of variable-based user interface 62, where each cell of column 64II allows analyst 8 to specify a version dimension for an associated one of the plurality of variable definitions in an alternative way to specifying it via dimensionality column 64C.

Columns 64DD-64II accepts from analyst 8 a string defining the respective dimensions. Once specified, user interface 62 may automatically populate dimensionality column 64C of the associated variable definition with the inputs of analyst 8 according to the syntax discussed above in reference to dimensionality column 64C. Alternatively, user interface 62 may automatically populate columns 64DD-66II with the dimensions defined via dimensionality column 64C. In this manner, a plurality of variable definitions may be defined, and based on these variable definitions, an enterprise planning modeling may be built. This variable-centric modeling enables analysts 8 to think in terms of their "native" language, or end variables instead of having to learn a "foreign" modeling language in order to create these complex enterprise models.

Figure 5:
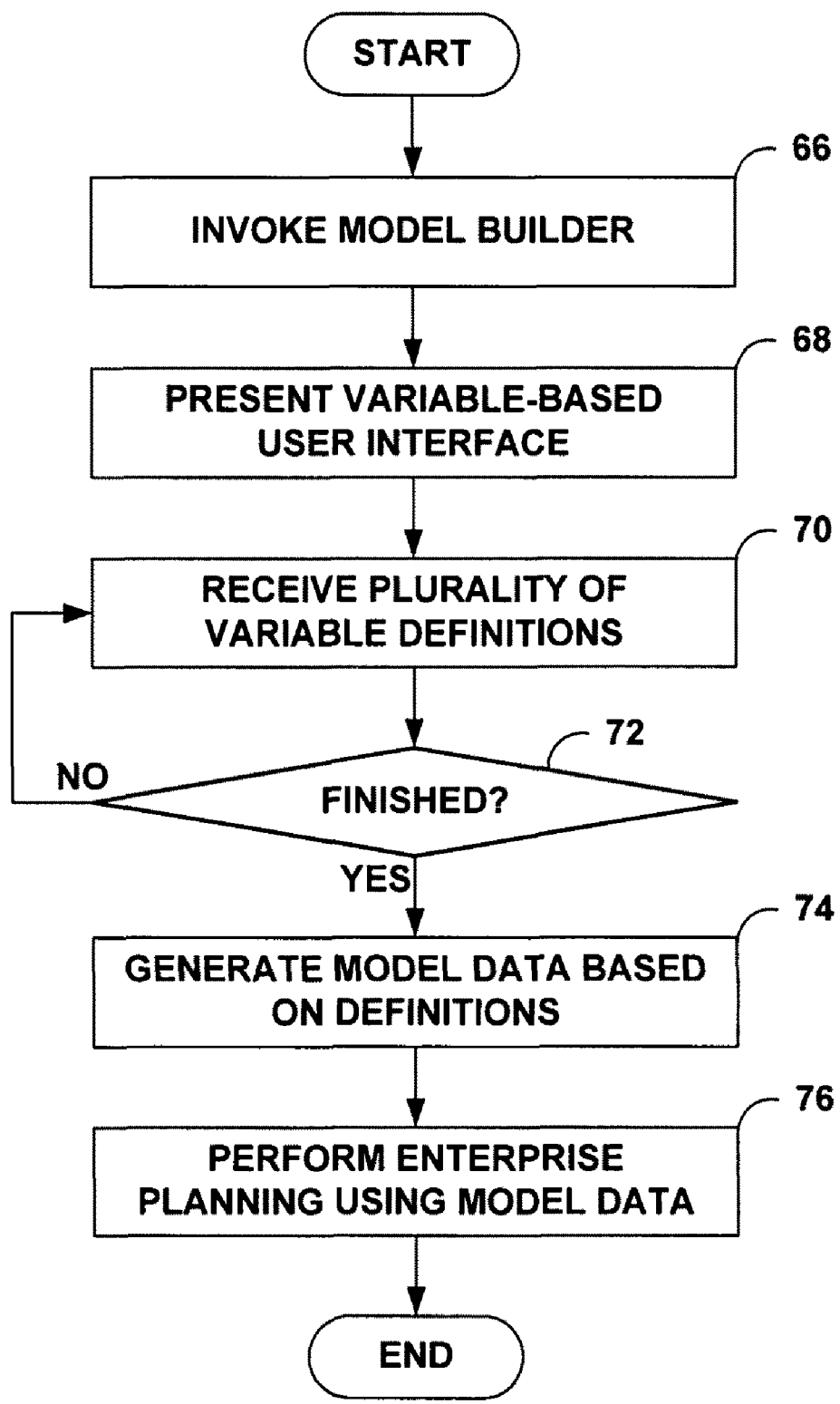
FIG. 5 is a flow chart illustrating exemplary operation of an enterprise planning and performance management system in providing variable-based modeling.

FIG. 5 is a flow chart illustrating exemplary operation of an enterprise planning and performance management system, such as enterprise planning and performance management system 3 of FIG. 2, in providing variable-based model building. Although discussed in reference to FIGS. 2, 4, the principles of the invention may apply to any enterprise planning and performance management system capable of presenting a user interface, such as variable-based user interface 62.

Initially, a user, typically designated as an analyst 8, logs into and invokes a model building software module of enterprise planning and performance management system 3 (66). Once invoked, enterprise planning and performance management system 3, and in particular model builder 30, presents a user interface, such as variable-based user interface 62, for providing definitions for pertinent variables for the subsequent planning and performance management sessions (68). Analyst 8 interacts with the variable-based user interface in one or more of the above described manners to input the variable definitions (70). For example, an analyst 8 may input a variable name, specify the dimensions according to a dimensionality type: dimension pair, input a time aggregate formula, input a hierarchy aggregate formula, input an actuals formula, and input a "Member of" indicator via the associated columns 64A-66II of the above described variable-based user interface 62.

If analyst 8 wishes to continue modeling via variable-based user interface 62, i.e., define further variables, analyst 8 may locally or remotely save the currently defined variables within user interface 62. In this instance, analyst 8 may, upon logging into another session, continue modeling with the currently defined variables populated within user interface 62 ("NO" 72). Once analyst 8 finishes entering the plurality of variable definitions ("YES" 72), model builder 30 generates model data to produce an enterprise and performance management model for use in controlling a subsequent enterprise planning session involving users designated as contributors 6 and reviewers 7 (74). The model data is generated so as to reflect the various aspects of the plurality of variable definitions, as described above.

After the model has been generated, contributors 6 and reviewers 7 log into enterprise planning and performance management system 3 and engage in an enterprise planning session by which they interact with contribution module 32 in accordance with the model. During these enterprise planning sessions, contribution module 32 may access model data 42B generated by model builder 30 in order to facilitate correct presentation, entry, storage and review of contribution data (e.g., planning data 42C) (76).

In this manner, enterprise planning and performance management system 3 provides a more understandable and focused user interface that allows model developers, such as analysts 8, to generate models from a variable, end-goal, perspective. Because of this perspective, analysts 8 may more quickly define focused models for various aspects of enterprise 4 via a clear, variable-centric syntax supported by variable-based user interface 62.

Various embodiments of the invention have been described. These and other embodiments are within the scope of the following claims.

The invention claimed is:

1. A computer-implemented method comprising:
   receiving, with a user interface within an enterprise planning system, a plurality of variable definitions, each of the variable definitions specifying a plurality of variables to be used during the enterprise planning session, wherein receiving the plurality of variable definitions comprises:
   receiving, via a first input area of the user interface a default mathematical formula for each of the variables of the plurality of variables to be used during the enterprise planning session,
   receiving, via a second input area of the user interface, an optional override mathematical formula for each of the variables of the plurality of variables to be used during the enterprise planning session; and
   receiving, via a third input area of the user interface one or more dimensions for each of the variables of the plurality of variables to he used during the enterprise planning session and respective dimension types associated with each of the one or more dimensions,
   wherein the method further comprises:
   generating, with a processor, model data that defines an enterprise planning model based on the plurality of variable definitions received via the user interface, wherein the enterprise planning model is used within the enterprise planning session, and wherein generating the model data comprises generating the model data to include one or more multidimensional data structures based on the variable definitions, the one or more multidimensional data structures having dimensionality based on the dimensions and the dimension types received with respect to, each of the variables; and
   executing the enterprise planning session, wherein executing the enterprise planning session comprises:
   collecting planning data relevant to one or more of the plurality of variables from a set of contributors;
   aggregating the collected planning data in accordance with the enterprise planning model to form aggregated enterprise planning data for the enterprise planning session;
   applying the default mathematical formula of each variable to the planning data to compute a value for each of the variables for future periods within a forecast, wherein each of the variables is used during the enterprise planning session;
   when the optional override mathematical formula is specified, applying the optional override mathematical formula of each of the variables to the planning data to compute a value for the respective variable for historical periods within the forecast; and
   outputting the forecast to the user interface.

2. The method of claim 1, further comprising using the respective default mathematical formula for each of the variables to compute the values for the variables for both the future periods within the forecast and the historical periods within the forecast.

3. The method of claim 1,
   wherein the user interface includes a time aggregate input area for defining a time aggregate formula within the plurality of variable definitions to override the default mathematical formula and be applied when calculations of summary members of a time hierarchy of the enterprise planning model differ from leaf members of the time hierarchy, wherein the time hierarchy comprises aggregated members and non-aggregated members, and wherein the summary members are the aggregated members, and the leaf members are the non-aggregated members.

4. The method of claim 1,
   wherein the user interface includes a hierarchy aggregate input area for defining a hierarchy aggregate formula within the plurality of variable definitions to override the mathematical formula and be applied when calculations of summary members of a hierarchy of the enterprise planning model differ from leaf members of the hierarchy, wherein the hierarchy comprises aggregated members and non-aggregated members, and wherein the summary members are the aggregated members, and the leaf members are the non-aggregated members.

5. The method of claim 1,
   wherein generating the model data comprises generating the model data to include one or more data cubes having dimensionality based on the dimensions and the dimension types received with respect to each of the variables.

6. The method of claim 1, wherein the user interlace includes an input area for specifying that one or more of the variables varies as a function of another one or more of the variables.

7. The method of claim 1, wherein the user interface includes a variable-based user interface having a variable name input area for defining a variable name for each of the plurality of variable definitions.

8. The method of claim 1,
   wherein the user interface includes an input area to receive access control information associated with each of the variables;
   wherein generating the model data includes generating the model data to include a plurality of hierarchical arranged nodes, wherein each node represents an organization unit within an enterprise, and further wherein each node is associated with one or more user roles, and
   wherein executing the enterprise planning session includes providing access control of the planning data based on access control information for nodes of the model and providing access control of the planning data based on the access control information for the variables.

9. A computing system comprising:
   a processor configured to execute an analysis software module that receives, with a user interface, a plurality of variable definitions, each of the variable definitions specifying a plurality of variables to be used during the enterprise planning session, wherein the analysis software module receives via a first input area of the user interface, a default mathematical formula for each of the variables of the plurality of variables to be used during the enterprise planning session, receives, via a second input area of the user interface, an optional override mathematical formula for each of the variables of the plurality of variables to be used during the enterprise planning session, and receives, via a third input user interface, one or more dimensions for each of the variables of the plurality of variables to be used during the enterprise planning session and respective dimension types associated with each of the one or more dimensions wherein the analysis software module generates model data that defines an enterprise planning model based on the plurality of variable definitions received via the user interface, wherein the enterprise planning model is used within the enterprise planning session, wherein the analysis software module generates the model data to include one or more multidimensional data structures based on the variable definitions, the one or more multidimensional data structures having dimensionality based on the dimensions and the dimension types received with respect to each of the variables, wherein the analysis software module executes the enterprise planning session, collects planning data relevant to one or more of the plurality of variables from a set of contributors, aggregates collected data in accordance with the enterprise planning model to form aggregated planning data for the enterprise planning session, applies the default mathematical formula of each variable to the planning data to compute a value for each of the variables for future periods within a forecast, wherein each of the variables is used during the enterprise planning session, wherein, when the optional override mathematical formula is specified, the analysis software module applies the optional override mathematical formula of each of the variables to the planning data to compute a value for the respective variable for historical periods within the forecast, and wherein the analysis software module outputs the forecast to the user interface.

10. The computing system of claim 9, wherein the analysis software module generates the model data by automatically generating the model data to include one or more data cubes based on the variable definitions received via the user interface.

11. The computing system of claim 9, wherein, for each of the variable definitions, the enterprise planning software is configured to use to the default mathematical formula to compute the value for the variable for both the future periods within the forecast and the historical periods within the forecast.

12. The computing system of claim 9, wherein the user interface includes a time aggregate input area for defining a time aggregate formula within the plurality of variable definitions to override the default mathematical formula in instances where calculations of summary members of a time hierarchy of the enterprise planning model differ from leaf members of the time hierarchy, wherein the time hierarchy comprises aggregated members and non-aggregated members, and wherein the summary members are the aggregated members, and the leaf members are the non-aggregated members, 13. The computing system of claim 9, wherein the user interface includes a hierarchy aggregate input area for defining a hierarchy aggregate formula to override the default mathematical formula in instances where calculations of summary members of a hierarchy of the enterprise planning model differ from leaf members of the hierarchy, wherein the hierarchy comprises aggregated members and non-aggregated members, and wherein the summary members are the aggregated members, and the leaf members are the non-aggregated members.

14. The computing system of claim 9, wherein the enterprise planning software generates the model data to include one or more data cubes having dimensionality based on the dimensions and the dimension types received with respect to each of the variables.

15. The computing system of claim 9, wherein the user interface includes an input area for specifying that one or more of the variables varies as a function of another one or more of the variables.

16. The computing system of claim 9, wherein the user interface includes presenting a variable-based user interface having a variable name input area for defining a variable name for each of the plurality of variable definitions.

17. The computing system of claim 9, further comprising a database for storing the model data, wherein the analysis software module, upon generating the model data, stores the model data to the database.

18. A computer-readable storage medium comprising instructions stored therein that when executed, cause a programmable processor to:
receive, with a user interface within an enterprise planning system, a plurality of variable definitions, each of the variable definitions specifying a plurality of variables to be used during the enterprise planning session, wherein the instructions that cause the programmable processor to receive the plurality of variable definitions comprise instructions that cause the programmable processor to:
receive, via a first input area of the user interface, a default mathematical formula for each of the variables of the plurality of variables to be used during the enterprise planning session;
receive, via a second input area of the user interface, an optional override mathematical formula for each of the variables of the plurality of variables to be used during the enterprise planning session; and
receive, via a third input area of the user interface, one or more dimensions for each of the variables of the plurality to be used during enterprise planning session and respective dimension types associated with each of the one or more dimensions,
wherein the computer-readable storage medium further comprises instructions stored therein that when executed cause the programmable processor to:
generate model data that defines an enterprise planning model based on the plurality of variable definitions received via the user interface, wherein the enterprise planning model is used within the enterprise planning session, and wherein the instructions that cause the programmable processor to generate the model data comprise instructions that cause the programmable processor to generate the model data to include one or more multidimensional data structures based on the variable definitions, the one or more multidimensional data structures having dimensionality based on the dimensions and the dimension types received with respect to each of the variables; and
execute the enterprise planning session, wherein the instructions that cause the programmable processor to execute the enterprise planning session comprise instructions that cause the programmable processor to:
collect planning data relevant to one or more of the plurality of variables from a set of contributors;
aggregate the collected planning data in accordance with the enterprise planning model to form aggregated planning data for the enterprise planning session;
apply the default mathematical formula of each variable to the planning data to compute a value for each of the variables for future periods within a forecast, wherein each of the variables is used during the enterprise planning session;
when the optional override mathematical formula is specified, apply the optional override mathematical formula of each of the variables to the planning data to compute a value for the respective variable for historical periods within the forecast; and
output the forecast to the user interface.

19. The computer-readable storage medium of claim 18, wherein the instructions cause the enterprise planning system to present the user interface to include an input area for specifying one or more rules for automatically calculating values for the variables to populate a new forecast period upon rollover of a previous forecast period.

* * * * *